US006985880B1

(12) United States Patent
Hodgdon et al.

(10) Patent No.: US 6,985,880 B1
(45) Date of Patent: Jan. 10, 2006

(54) METHOD OF RISK MANAGEMENT AND OF ACHIEVING A RECOMMENDED ASSET ALLOCATION AND WITHDRAWAL STRATEGY, AND COMPUTER-READABLE MEDIUM, APPARATUS AND COMPUTER PROGRAM THEREOF

(75) Inventors: Stephen J. Hodgdon, Greenwich, CT (US); Charles W. Kadlec, Summit, NJ (US)

(73) Assignee: Seligman Advisors, Inc., New York, NY (US)

( * ) Notice: Subject to any disclaimer, the term of this patent is extended or adjusted under 35 U.S.C. 154(b) by 0 days.

(21) Appl. No.: 09/259,770

(22) Filed: Mar. 1, 1999

(51) Int. Cl.
    *G06F 17/60* (2006.01)
(52) U.S. Cl. ............................ 705/36; 705/35; 705/37; 705/10
(58) Field of Classification Search ................. 705/35, 705/36, 37, 10
    See application file for complete search history.

(56) References Cited

U.S. PATENT DOCUMENTS

| 5,774,881 | A | | 6/1998 | Friend et al. .................. 705/36 |
| 5,806,042 | A | | 9/1998 | Kelly et al. ..................... 705/4 |
| 5,806,049 | A | * | 9/1998 | Petruzzi ....................... 705/36 |
| 5,878,405 | A | * | 3/1999 | Grant et al. .................. 705/10 |
| 5,893,080 | A | * | 4/1999 | McGurl et al. .............. 705/10 |
| 5,933,815 | A | * | 8/1999 | Golden ........................ 705/35 |
| 6,012,043 | A | * | 1/2000 | Albright et al. .............. 705/10 |
| 6,021,397 | A | * | 2/2000 | Jones et al. .................. 705/36 |
| 6,055,517 | A | * | 4/2000 | Friend et al. ................. 705/36 |
| 6,240,399 | B1 | * | 5/2001 | Frank et al. .................. 705/35 |
| 6,253,192 | B1 | * | 6/2001 | Corlett et al. ................. 705/35 |
| 6,336,103 | B1 | * | 1/2002 | Baker ........................... 705/36 |

FOREIGN PATENT DOCUMENTS

EP 0 434 877 A1 * 12/1989
EP 0434877 A1 * 12/1989

OTHER PUBLICATIONS

Bengen, William; Determining withdrwal rates using historical data, Journal of Financial Planning, Oct. 1994.*
Jovin, Ellen ; New Software, New Sophistication: These programs promise to improve the quality of financial advice..; Finacial Planning, Aug. 1998.*
Bernstein, William; The Retirement Calculator from Hell, Index Funds Strategies, Nov. 1998.*
"Timing Risk and the Impact of Volatility on Retirement Planning", printed from http://www.harborgroup.com/, copyright 1998.*
O'Haver; The Retirement Income Simulation Spreadsheet; University of Maryland, Apr. 1998, revised Nov. 1999.*

(Continued)

*Primary Examiner*—Jagdish N Patel
(74) *Attorney, Agent, or Firm*—Morgan & Finnegan, LLP

(57) ABSTRACT

The new and improved method and apparatus of the invention generates a hypothetical illustration of a distribution of possible portfolio values and withdrawal amounts for a designated time period. The invention also provides a new and improved method and apparatus for determining a hypothetical distribution of investment outcomes for a specified portfolio based on a Monte Carlo analysis of historical rates of return for the portfolio and historical rates of inflation. The invention further provides a new and improved method for determining a withdrawal strategy using a combination of fixed dollar and fixed percent withdrawals. The hypothetical illustration of the invention is generated by interacting the combinations of fixed dollar and fixed percent withdrawals, with the hypothetical distribution of investment outcomes for a specified portfolio to facilitate a recommended asset and withdrawal strategy.

38 Claims, 31 Drawing Sheets

OTHER PUBLICATIONS

Geer, Caroline T.; "Personal Finance: Factoring Uncertainty Into Retirement Planning: The Monte Carlo Method"; Fortune Magazine; 200; Jan. 11, 1999.

Roha, Ronaleen; "Cracking your nest egg": (investing in retirement); Kiplinger's Personal Finance Magazine (Kiplingers Pers Finance Mag) v52, No. 10 (Oct. '98) p126-9.

Cordaro, Christopher J.; "Using Monte Carlo Simulations for Retirement Planning;" Retirement Planning/Jul.-Aug. 1998; p39-44.

Clements, Jonathan; "Riding Out Retirement; Knowing how to manage your retirement fund so that you don't run out too soon can be difficult—especially when you can't predict the stock market or future levels of inflation"; The Wall Street Journal; Jun. 15, 1998, Monday, Star Edition; Section: Business, p1.

Kennedy, James K.; Nash, Robert T.; Bonno, John Andrew; "How Much is Enough? A Guide to Planning for a Retirement Portfolio"; Journal of Financial Planning; Section: Contributions; Jun. 1998; pp82-88.

Bengen, CFP, William P.; "Conserving Client Portfolios During Retirement, Part III"; Journal of Financial Planning; Dec. 1997; Section: Contributions; pp84-97.

Sit, Mary; "Making the savings last Experts say planning is key to keeping money worries at bay"; Boston Globe (Boston, MA, US); Section: Home Economics: Retirement; Publication date: 971110.

Spragins, Ellyn E.; "No time to waste: the rules for investors change in the years just before and after retirement. Here's a handbook. (Focus On Your Money)"; Newsweek; Mar. 24, 1997; v129, n12, p84(2).

Simon, Ruth; "How to be sure you never go broke; (retirement planning report; cover story)"; Money (Money); Oct. '96; v25; p100-1+.

Veres, Robert N., "The Monte Carlo Solution"; Dow Jones Investment Advisor; 21$^{st}$ Century Planner: Attachment 2: May 1996; p35, 36 & 38.

Smith, Anne Kates; "Picking up the pieces: strategies: rebuilding your portfolio for the next bull market"; (1991 Investment Guide) (Cover Story); U.S. News & World Report; Dec. 17, 1990; v109, n24, p90(2).

Edgerton, Jerry; "Make your money last a lifetime; when you live on your investments, managing them is serious business"; (Special Report: Six Steps to Financial Freedom); Money, Nov, 1986; v15, p100(4).

Currier, Chet; "Pros and Cons of Mutual Fund Withdrawal Plans"; Dateline: New York Priority: Weekday Advance; Oct. 30, 1985.

Cooley, Philip L.; Hubbard, Carl M.; Walz, Daniel T.; "Sustainable Withdrawal Rates from Your Retirement Portfolio"; Document printed by Department of Business Administration, Trinity University, San Antonio, TX 78212-720; 210-726-7281; Internet address: PCOOLEY@TRINITY.EDU. (not dated).

Luxenberg, Stan; "Calibrating the right mix for your retirement portfolio. (Special Section: Planning for Retirement)"; Medical Economics, v73, n11, p53(5); Jun. 10, 1996.

Nelson, Stephen L.; "Plan for a successful retirement; calculate what you need to contribute now to build a healthy nest egg;" PC World; v11, n3, pL21(4); Mar., 1993.

Database ABI/INFORM On-line! UMI retrieved from DIALOG accession No. 01202388 XP002911248 the whole document; Tim McCollum: "Adding some byte to retirement plans", Nation's Business, vol. 84, No. 8, May 1996, pates 52-55.

"Vanguard Retirement Planner Version 3.0 for Windows Retirement Planning Software User's Manuel" 1995 XP002911250 pp. 2-22.

C.W. Kadlec, 1998, "Seligman: Helping You Help Your Clients Harvest a Lifetime of Savings", Financial Planning Fee-Based Planning: The Complete Guide, vol. 28, (8):32-33.

* cited by examiner

SELIGMAN
HARVESTER:
THE PATH TO YOUR
SELIGMAN SOLUTION
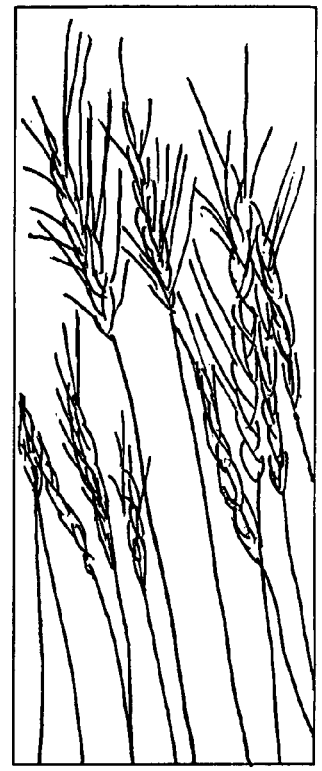
WORKBOOK
TIMES
CHANGE
———•———
VALUES
ENDURE
J. & W. SELIGMAN & Co.
INCORPORATED
ESTABLISHED 1864
FIG.1A

*Harvester Workbook*

This workbook is designed to help you approximate your retirement income needs. Once you have completed the workbook, meet with your financial advisor to discuss the results. He or she can help you construct an investment strategy suited to your specific needs.

Name: _____  Date: _____

1  INVESTABLE ASSETS— Taking inventory of how much you have to invest, as well as your current asset allocation, is necessary to determine where your portfolio needs to be adjusted.

|   | COMBINED | HUSBAND | WIFE |
|---|---|---|---|
| a) CDs | ___ | ___ | ___ |
| b) Money Market Funds/ Bank Deposits | ___ | ___ | ___ |
| c) Individual Bonds | ___ | ___ | ___ |
| d) Individual Stocks | ___ | ___ | ___ |

2  ESTIMATED SOURCES OF INCOME— For most retirees, the income they receive from Social Security and company-sponsored pensions will not be sufficient to sustain their lifestyle in retirement. However if prudently utilized, your retirement account can be nicely supplemented with these sources of income. Please indicate below the MONTHLY income you and your spouse derive from each source.

|   | COMBINED | HUSBAND | WIFE |
|---|---|---|---|
| a) Social Security | ___ | ___ | ___ |
| b) Pension Plan | ___ | ___ | ___ |
| c) Monthly Survivor Benefit | ___ | ___ | ___ |

| FIG.1B-1 |
|---|
| FIG.1B-2 |

FIG.1B    FIG.1B-1 e) Tax-Exempt Bond
   Mutual Funds         _____   _____ = _____ f) Taxable Bond
   Mutual Funds         _____   _____ = _____ g) Equity
   Mutual Funds         _____   _____ = _____ h) IRA or Other
   Tax-Deferred Plans   _____   _____ = _____ i) Other                _____   _____ = _____
                                            _____ j) TOTAL INVESTABLE
   ASSETS                                   $ _____

*Go to Page 3.*
   *Insert this figure in Section 6,*
   *Line 2 and Section 7, Line 2.* d) Fixed Annuity
   Payments          _____ e) Variable Annuity
   Payments          _____ f) Other             _____
                     _____

SUBTOTAL          $ _____   *multiply monthly subtotal by 12 to arrive at:* g) TOTAL YEARLY
   INCOME            $ _____

*Go to Page 3.*
   *Insert this figure in Section 5,*
   *Line 2.*

FIG.1B-2

3 ESTIMATED FIXED EXPENSES ("Needs")—Needs are your set expenses that cannot be compromised. This is the minimum amount of money required for you to live. Please indicate your MONTHLY expenses below.

a) Morgage/Rent ___ b) Health Insurance ___ c) Taxes
Income (federal/state, local)
Real Estate ___ d) Car Insurance/Maintenance ___ e) Basic Living Expenses
(i.e., food, clothing, etc.) ___ f) Other
(i.e., home maintenance,
medical costs, insurance, etc.) ___

SUBTOTAL
*multiply monthly subtotal by 12 to arrive at:* ($) ___ g) TOTAL YEARLY NEEDS ___

*Insert this figure in Section 5, Line 1.*

5 ESTIMATE YOUR "NET NEED"

1. TOTAL "NEEDS" (Section 3, Line "g") ___

*minus*

2. TOTAL COMBINED INCOME
   (Section 2, Line "g") ___

3. ESTIMATED NET NEED ($) ___

*Insert this figure in Section 6,
   Line 1. below*

6 ESTIMATE YOUR FIXED-DOLLAR "NEED" RELATIVE TO YOUR ASSETS

1. NET "NEED" (estimated from Section 5) ___

*divided by*

2. TOTAL INVESTABLE ASSETS
   (Section 1, Line "j") ___

3. ESTIMATED NET FIXED-DOLLAR NEED
   AS A PERCENT OF TOTAL ASSETS (%) ___

*Insert this figure in Section 8,
   Line 1. below.*

4 FLEXIBLE EXPENSES ("Wants")—These expenses are not absolute priorities; they are things that improve your quality of life. If need be, these are things you can postpone or, perhaps, do without. Please indicate your MONTHLY expenses below.

a) Travel _____
b) Dining/Entertaiment _____
c) Gifts to Charity _____
d) Gifts to Children/Grandchildren _____
e) New Car _____
f) Hobbies _____
g) Other _____ _____

SUBTOTAL ========
*multiply monthly subtotal by 12 to arrive at:*
h) TOTAL YEARLY WANTS $_____

*Insert this figure in Section 7, Line 1.*

7 ESTIMATE YOUR FIXED-PERCENT "WANTS" RELATIVE TO YOUR ASSETS

1. TOTAL "WANTS" (Section 4, Line "h") _____

*divided by*

2. TOTAL INVESTABLE ASSETS (Section 1, Line "j") _____

3. ESTIMATED WANTS AS A PERCENT OF TOTAL ASSETS _____%

*Insert this figure in Section 8, Line 2. below.*

8 ESTIMATE YOUR TOTAL NET NEEDS PLUS WANTS

1. ESTIMATED NET FIXED-DOLLAR NEED AS A PERCENT OF TOTAL ASSETS (Section 6, Line "3") _____%

*plus*

2. ESTIMATED WANTS AS A PERCENT OF TOTAL ASSETS (Section 7, Line "3") _____%

3. TOTAL NET NEED PLUS WANTS _____%

FIG.1C-2

HARVESTER PROPOSAL REQUEST FORM

How to Generate a Harvester Proposal for Your Client

1. Review the completed Harvester Workbook with your client and revise the information as necessary.

2. Complete this form and fax it along with the Workbook sheets

Seligman will notify you upon receipt of your request and schedule an appointment to review the proposal at your earliest convenience.

If you have any questions about generating a Harvester proposal, please contact your Seligman Sales Professional Financial Advisor Information Name_____ Title_____
Rep Number_____ Firm_____
Street Address_____
City_____ State_____ Zip_____
Phone_____ Fax_____ E-mail_____

FIG.2A

| FIG.2A |
|--------|
| FIG.2B |

FIG.2

Client Information

In addition to providing client names, please indicate how you wish your clients to be addressed in the proposal by checking the appropriate courtesy titles.

☐ Mr.   ☐ Ms.
☐ Messrs. ☐ Miss
☐ Mrs.  ☐ Mr. and Mrs.

Name _____

☐ Mr.   ☐ Ms.
☐ Messrs. ☐ Miss
☐ Mrs.  ☐ Mr. and Mrs.

Name _____

Your Harvester Recommendation

Select a Withdrawal Strategy
*(total cannot exceed 12%)*

___ % fixed-dollar
___ % fixed-percentage

Select a Harvester Portfolio

☐ Harvester 30-60-10
☐ Harvester 40-50-10
☐ Harvester 50-40-10
☐ Harvester 55-35-10
☐ Harvester 60-30-10
☐ Harvester 65-25-10
☐ Harvester 70-20-10
☐ Harvester 75-15-10
☐ Harvester 80-10-10

FOR BROKER/DEALER USE ONLY

Distributed by Seligman Advisors, Inc

FIG.2B

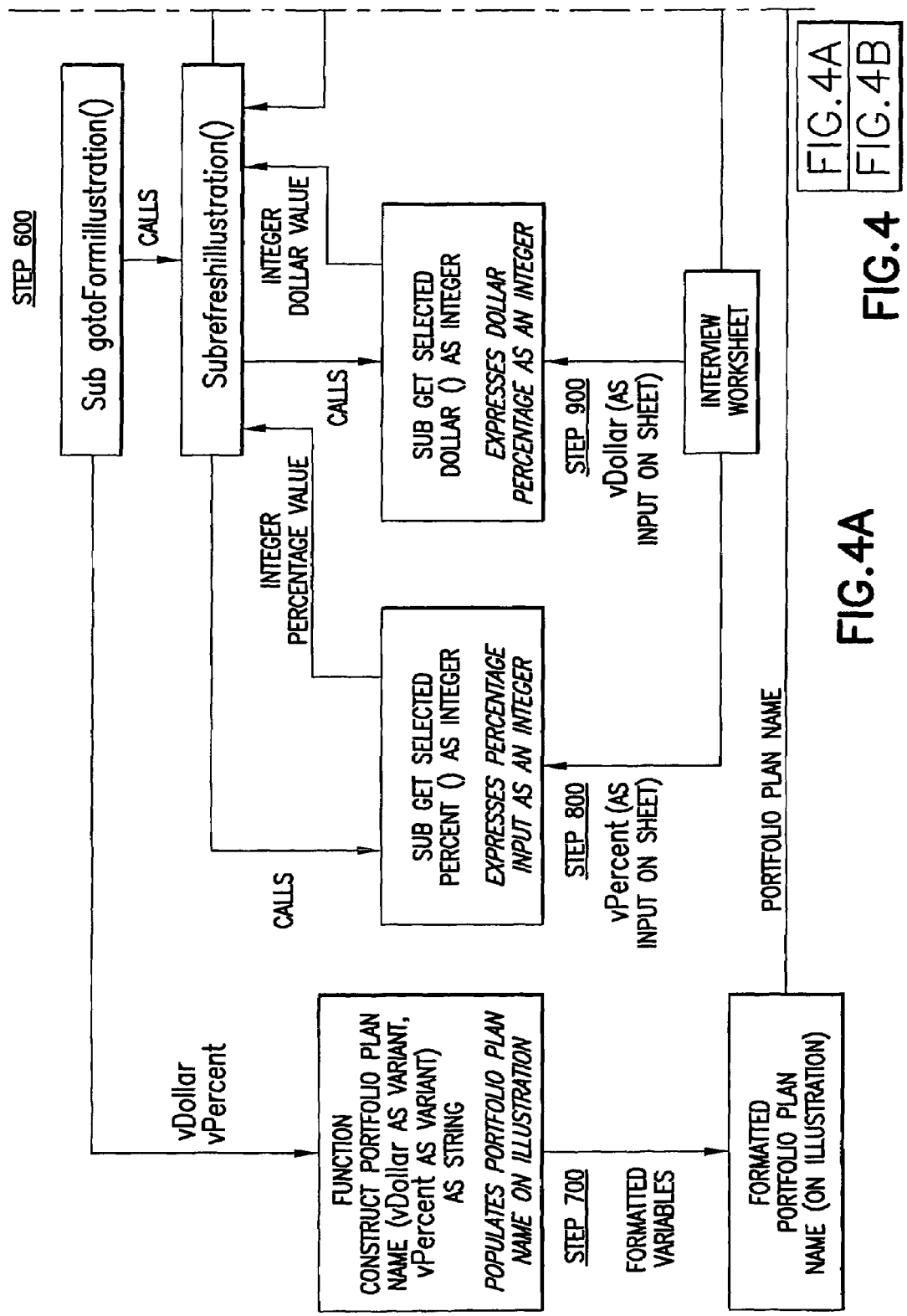

SELIGMAN

SELIGMAN HARVESTER

Prepared for: Mr. & Mrs. M.T.Nester
Date Prepared: 12/18/98
Initial Investment: $1,000,000

<u>6% Fixed Dollar Withdrawal</u>
(Percent of initial investment)
(Indexed to inflation)

<u>2% Fixed Percent Withdrawal</u>
(Percent of each year's portfolio value)

Hypothetical Illustration

<u>Asset Allocation: H 60-30-10</u>

<u>60% Equity</u>
35% U.S. Large-Cap Stocks
10% U.S. Small-Cap Stocks
15% International Large-Cap Stocks <u>30% Bonds</u>
30% U.S. Corporate Bonds <u>10% Cash</u>
10% U.S. Treasure Bills

| FIG.6A-1 |
|----------|
| FIG.6A-2 |

Prepared by:

[ Trusted Financial Adviser ]

Seligman Financial Services has supplied this illustration in response to the request of a specific client, and it has been prepared to meet that client's special instructions. It may not be reproduced or used in verbal or written form with other clients. This hypothetical illustration is not a forecast or a projection of future results; it is based on the Monte Carlo Statistical Technique which uses historical data from 1950 to 1997 (in random order) on various asset allocation and withdrawal strategies. The resulting hypothetical returns are based on asset class returns, not specific fund returns. A more detailed explanation of the Monte Carlo Statistical Technique is available by calling Seligman Financial Services at 800-221-2783.

This hypothetical must be accompanied by each recommended Fund's current prospectus, which contains more complete information about sales charges, expenses, and risk factors. Each Fund's rate of return will vary, and the principal value of an investment in any Fund will fluctuate so that shares, on any given day or when redeemed, may be worth more or less than their original cost.

Although common stocks have produced higher historical returns, they may subject principal to greater risk than other types of investments. The stocks of smaller companies may be subject to above-average market fluctuations. There are specific risks associated with global investing, such as currency fluctuations, foreign taxation, differences in financial reporting practices, and changes in political conditions. The securities in which Seligman High-Yield Bond Fund invests are subject to a greater risk of loss of principal and interest than higher rated investment-grade bonds.

FIG.6A-2

SELIGMAN 

SELIGMAN HARVESTER

Hypothetical Illustration

| | |
|---|---|
| Prepared for: | Mr. & Mrs. M.T.Nester |
| Prepared by: | Trusted Financial Advisor |
| Date Prepared: | 12/18/98 |
| Portfolio: | H 60-30-10 |
| Withdrawal Plan: | 6% of Initial Investment Increased each year by prior year's change in CPI, and 2% prior year-end portfolio value |

| | |
|---|---|
| Initial Investment: | $1,000,000 |
| Fixed-Dollar Withdrawal: (indexed for inflation) | $60,000 |
| Fixed-Percent Withdrawal: | 2% |

Hypothetical Portfolio Value*

| Year-end | worst | | median | | | | best |
|---|---|---|---|---|---|---|---|
| | 10% | 25% | 33.3% | 50% | 33.3% | 25% | 10% |
| 1 | $882,191 | $944,876 | $977,423 | $1,031,518 | $1,081,649 | $1,100,949 | $1,165,435 |

FIG.6B-1

| FIG.6B-1 |
|---|
| FIG.6B-2 |

FIG.6B

|    |          |          |          |            |            |            |
|----|----------|----------|----------|------------|------------|------------|
| 2  | $850,918 | $944,880 | $982,461 | $1,057,331 | $1,165,257 | $1,265,272 |
| 3  | $824,151 | $939,876 | $988,487 | $1,076,537 | $1,223,946 | $1,361,180 |
| 4  | $800,394 | $932,463 | $990,231 | $1,098,422 | $1,283,362 | $1,456,457 |
| 5  | $768,475 | $922,589 | $990,935 | $1,118,759 | $1,337,338 | $1,554,676 |
| 6  | $732,195 | $909,642 | $991,877 | $1,146,161 | $1,390,268 | $1,644,182 |
| 7  | $700,209 | $899,173 | $992,040 | $1,161,595 | $1,457,015 | $1,747,829 |
| 8  | $661,306 | $885,381 | $982,734 | $1,171,321 | $1,509,554 | $1,856,002 |
| 9  | $615,379 | $860,045 | $967,962 | $1,184,430 | $1,556,845 | $1,957,407 |
| 10 | $566,358 | $827,028 | $955,164 | $1,193,938 | $1,622,201 | $2,094,930 |
| 11 | $504,172 | $802,324 | $939,743 | $1,198,744 | $1,669,687 | $2,218,841 |
| 12 | $437,575 | $760,936 | $912,278 | $1,199,617 | $1,742,782 | $2,343,367 |
| 13 | $366,411 | $710,816 | $884,135 | $1,198,449 | $1,793,033 | $2,487,663 |
| 14 | $276,430 | $657,628 | $835,265 | $1,193,484 | $1,871,025 | $2,647,814 |
| 15 | $171,845 | $595,631 | $790,903 | $1,177,056 | $1,939,594 | $2,803,478 |
| 16 | $52,423  | $522,914 | $732,166 | $1,151,612 | $1,985,440 | $2,973,473 |
| 17 | $0       | $435,351 | $663,157 | $1,126,536 | $2,047,126 | $3,139,024 |
| 18 | $0       | $341,800 | $593,386 | $1,076,096 | $2,080,982 | $3,323,710 |
| 19 | $0       | $224,865 | $496,243 | $1,033,100 | $2,133,980 | $3,520,748 |
| 20 | $0       | $96,386  | $392,148 | $989,280   | $2,186,380 | $3,762,233 |
| 21 | $0       | $0       | $273,373 | $923,105   | $2,253,701 | $3,975,705 |
| 22 | $0       | $0       | $143,667 | $844,825   | $2,310,783 | $4,234,921 |
| 23 | $0       | $0       | $0       | $756,668   | $2,364,316 | $4,457,672 |
| 24 | $0       | $0       | $0       | $643,307   | $2,388,383 | $4,669,336 |
| 25 | $0       | $0       | $0       | $530,677   | $2,470,251 | $5,055,213 |
| 26 | $0       | $0       | $0       | $390,169   | $2,523,686 | $5,349,681 |
| 27 | $0       | $0       | $0       | $225,483   | $2,515,169 | $5,703,970 |
| 28 | $0       | $0       | $0       | $58,317    | $2,572,615 | $5,988,614 |
| 29 | $0       | $0       | $0       | $0         | $2,615,649 | $6,451,418 |
| 30 | $0       | $0       | $0       | $0         | $2,638,417 | $6,820,765 |

*Does not reflect the effect of income taxes or taxes on capital gains. Assumes all dividends and capital gains were reinvested.

FIG. 6B-2

SELIGMAN 

SELIGMAN HARVESTER

Hypothetical Illustration

| | |
|---|---|
| Prepared for: | Mr. & Mrs. M.T.Nester |
| Prepared by: | Trusted Financial Advisor |
| Date Prepared: | 12/18/98 |
| Portfolio: | H 60-30-10 |
| Withdrawal Plan: | 6% of Initial Investment Increased each year by prior year's change in CPI, and 2% prior year-end portfolio value |

| | |
|---|---|
| Initial Investment: | $1,000,000 |
| Fixed-Dollar Withdrawal: (indexed for inflation) | $60,000 |
| Fixed-Percent Withdrawal: | 2% |

| FIG.6C-1 |
|---|
| FIG.6C-2 |

FIG.6C

Hypothetical Withdrawal Value in Constant Dollars*

| | worst | | median | | | | best |
|---|---|---|---|---|---|---|---|
| Year-end | 10% | 25% | 33.3% | 50% | 33.3% | 25% | 10% |
| 1 | $80,000 | $80,000 | $80,000 | $80,000 | $80,000 | $80,000 | $80,000 |

FIG.6C-1

| | | | | | |
|---|---|---|---|---|---|
| 2 | $76,854 | $78,204 | $78,626 | $79,936 | $80,814 | $81,471 | $82,560 |
| 3 | $75,242 | $77,335 | $78,170 | $79,648 | $81,128 | $81,921 | $83,915 |
| 4 | $73,994 | $76,504 | $77,535 | $79,322 | $81,116 | $82,129 | $84,978 |
| 5 | $72,966 | $75,655 | $76,827 | $78,969 | $81,145 | $82,451 | $85,946 |
| 6 | $71,949 | $74,905 | $76,174 | $78,580 | $81,086 | $82,618 | $86,552 |
| 7 | $70,868 | $74,039 | $75,535 | $78,198 | $81,037 | $82,629 | $87,240 |
| 8 | $69,969 | $73,346 | $74,876 | $77,775 | $80,949 | $82,864 | $88,038 |
| 9 | $68,954 | $72,515 | $74,212 | $77,257 | $80,650 | $82,896 | $88,914 |
| 10 | $67,916 | $71,624 | $73,344 | $76,799 | $80,507 | $82,848 | $89,338 |
| 11 | $66,897 | $70,853 | $72,593 | $76,250 | $80,333 | $82,900 | $90,047 |
| 12 | $65,924 | $70,082 | $71,966 | $75,691 | $79,960 | $82,593 | $91,088 |
| 13 | $64,919 | $69,035 | $71,057 | $75,191 | $79,817 | $82,810 | $91,669 |
| 14 | $63,787 | $68,169 | $70,198 | $74,629 | $79,571 | $82,679 | $92,775 |
| 15 | $62,630 | $67,108 | $69,415 | $73,986 | $79,193 | $82,739 | $93,580 |
| 16 | $61,445 | $66,330 | $68,551 | $73,393 | $78,725 | $82,622 | $94,359 |
| 17 | $11,174 | $65,278 | $67,577 | $72,654 | $78,252 | $82,223 | $96,172 |
| 18 | $0 | $64,217 | $66,681 | $71,741 | $77,900 | $82,227 | $96,108 |
| 19 | $0 | $63,102 | $65,669 | $70,789 | $77,609 | $82,038 | $96,848 |
| 20 | $0 | $61,918 | $64,643 | $70,051 | $76,900 | $81,822 | $97,539 |
| 21 | $0 | $34,434 | $63,497 | $69,244 | $76,382 | $81,677 | $98,917 |
| 22 | $0 | | $62,322 | $68,270 | $75,866 | $81,517 | $99,248 |
| 23 | $0 | | $58,933 | $67,294 | $75,516 | $81,407 | $100,515 |
| 24 | $0 | | $0 | $66,313 | $74,921 | $81,320 | $102,194 |
| 25 | $0 | | $0 | $65,342 | $74,447 | $81,112 | $102,472 |
| 26 | $0 | | $0 | $64,251 | $73,548 | $80,769 | $103,462 |
| 27 | $0 | | $0 | $63,153 | $72,989 | $80,404 | $105,151 |
| 28 | $0 | | $0 | $61,995 | $72,404 | $79,724 | $105,939 |
| 29 | $0 | | $0 | $40,285 | $71,707 | $79,715 | $106,674 |
| 30 | $0 | | $0 | $0 | $70,991 | $79,369 | $107,760 |

*Does not reflect the effect of income taxes or taxes on capital gains. Assumes all dividends and capital gains were reinvested. Withdrawals are deflated by the increase in the actual CPI for each hypothetical result.

FIG.6C-2

SELIGMAN 

SELIGMAN HARVESTER

Hypothetical Illustration

Prepared for: Mr. & Mrs. M.T.Nester
Date Prepared: 12/18/98
Initial Investment: $1,000,000

8% Fixed Dollar Withdrawal
(Percent of initial investment)
(Indexed to inflation)

0% Fixed Percent Withdrawal
(Percent of each year's portfolio value)

Asset Allocation: H 60-30-10

60% Equity
35% U.S. Large-Cap Stocks
10% U.S. Small-Cap Stocks
15% International Large-Cap Stocks

30% Bonds
30% U.S. Corporate Bonds

10% Cash
10% U.S. Treasure Bills

FIG.7A-1

| FIG.7A-1 |
| FIG.7A-2 |

FIG.7A

Prepared by:

[Trusted Financial Adviser]

Seligman Financial Services has supplied this illustration in response to the request of a specific client, and it has been prepared to meet that client's special instructions. It may not be reproduced or used in verbal or written form with other clients. This hypothetical illustration is not a forecast or a projection of future results; it is based on the Monte Carlo Statistical Technique which uses historical data from 1950 to 1997 (in random order) on various asset allocation and withdrawal strategies. The resulting hypothetical returns are based on asset class returns, not specific fund returns. A more detailed explanation of the Monte Carlo Statistical Technique is available by calling Seligman Financial Services at 800-221-2783.

This hypothetical must be accompanied by each recommended Fund's current prospectus, which contains more complete information about sales charges, expenses, and risk factors. Each Fund's rate of return will vary, and the principal value of an investment in any Fund will fluctuate so that shares, an any given day or when redeemed, may be worth more or less than their original cost.

Although common stocks have produced higher historical returns, they may subject principal to greater risk than other types of investments. The stocks of smaller companies may be subject to above-average market fluctuations. There are specific risks associated with global investing, such as currency fluctuations, foreign taxation, differences in financial reporting practices, and changes in political conditions. The securities in which Seligman High-Yield Bond Fund invests are subject to a greater risk of loss of principal and interest than higher rated investment-grade bonds.

FIG.7A-2

SELIGMAN 

Hypothetical Illustration

SELIGMAN HARVESTER

| | |
|---|---|
| Prepared for: | Mr. & Mrs. M.T.Nester |
| Prepared by: | Trusted Financial Advisor |
| Date Prepared: | 12/18/98 |
| Portfolio: | H 60-30-10 |
| Withdrawal Plan: | 8% of Initial Investment Increased each year by prior year's change in CPI, and 0% prior year-end portfolio value |

| | |
|---|---|
| Initial Investment: | $1,000,000 |
| Fixed-Dollar Withdrawal: (indexed for inflation) | $80,000 |
| Fixed-Percent Withdrawal: | 0% |

| FIG.7B-1 |
|---|
| FIG.7B-2 |

FIG.7B

Hypothetical Portfolio Value*

| Year-end | worst | | | median | | | best | |
|---|---|---|---|---|---|---|---|---|
| | 10% | 25% | 33.3% | 50% | 33.3% | 25% | 10% | |
| 1 | $882,191 | $944,876 | $977,423 | $1,031,518 | $1,061,649 | $1,100,949 | $1,165,435 | |

FIG.7B-1

|  |  |  |  |  |  |  |
|---|---|---|---|---|---|---|
| 2 | $849,057 | $943,546 | $981,007 | $1,057,215 | $1,127,475 | $1,165,573 | $1,266,537 |
| 3 | $815,181 | $934,992 | $986,064 | $1,075,431 | $1,170,269 | $1,226,800 | $1,365,675 |
| 4 | $785,819 | $923,056 | $984,303 | $1,094,434 | $1,218,632 | $1,287,213 | $1,468,546 |
| 5 | $745,958 | $907,972 | $978,490 | $1,114,935 | $1,264,265 | $1,343,392 | $1,571,719 |
| 6 | $697,494 | $888,493 | $975,143 | $1,137,473 | $1,308,079 | $1,394,798 | $1,668,481 |
| 7 | $652,250 | $868,743 | $969,068 | $1,146,129 | $1,345,226 | $1,469,682 | $1,778,619 |
| 8 | $594,612 | $838,628 | $951,030 | $1,153,562 | $1,385,941 | $1,523,157 | $1,903,712 |
| 9 | $529,475 | $795,602 | $919,423 | $1,159,347 | $1,419,886 | $1,582,890 | $2,018,682 |
| 10 | $449,512 | $748,268 | $892,475 | $1,159,634 | $1,458,675 | $1,639,571 | $2,176,909 |
| 11 | $359,435 | $696,262 | $856,076 | $1,151,157 | $1,482,678 | $1,701,569 | $2,324,542 |
| 12 | $250,114 | $622,261 | $808,348 | $1,145,369 | $1,518,579 | $1,768,017 | $2,457,949 |
| 13 | $127,644 | $544,590 | $749,274 | $1,128,334 | $1,558,840 | $1,831,698 | $2,648,669 |
| 14 | $0 | $449,789 | $676,562 | $1,100,921 | $1,580,883 | $1,909,881 | $2,839,252 |
| 15 | $0 | $338,520 | $587,271 | $1,066,011 | $1,601,314 | $1,977,959 | $3,033,729 |
| 16 | $0 | $207,620 | $480,967 | $1,001,849 | $1,608,024 | $2,009,015 | $3,249,732 |
| 17 | $0 | $55,897 | $363,261 | $950,828 | $1,624,107 | $2,088,877 | $3,484,713 |
| 18 | $0 | $0 | $226,957 | $866,949 | $1,640,546 | $2,129,294 | $3,716,335 |
| 19 | $0 | $0 | $61,203 | $783,521 | $1,629,220 | $2,193,543 | $3,978,596 |
| 20 | $0 | $0 | $0 | $672,299 | $1,616,114 | $2,244,252 | $4,319,594 |
| 21 | $0 | $0 | $0 | $549,160 | $1,615,858 | $2,337,112 | $4,667,577 |
| 22 | $0 | $0 | $0 | $394,465 | $1,572,527 | $2,374,242 | $5,013,552 |
| 23 | $0 | $0 | $0 | $219,237 | $1,525,456 | $2,437,533 | $5,484,194 |
| 24 | $0 | $0 | $0 | $16,017 | $1,478,593 | $2,473,907 | $5,846,923 |
| 25 | $0 | $0 | $0 | $0 | $1,433,418 | $2,572,333 | $6,336,589 |
| 26 | $0 | $0 | $0 | $0 | $1,357,268 | $2,608,380 | $6,752,117 |
| 27 | $0 | $0 | $0 | $0 | $1,240,488 | $2,651,684 | $7,327,322 |
| 28 | $0 | $0 | $0 | $0 | $1,120,305 | $2,728,876 | $7,899,809 |
| 29 | $0 | $0 | $0 | $0 | $982,858 | $2,765,225 | $8,707,062 |
| 30 | $0 | $0 | $0 | $0 | $794,809 | $2,751,469 | $9,305,635 |

*Does not reflect the effect of income taxes or taxes on capital gains. Assumes all dividends and capital gains were reinvested.

FIG.7B-2

Hypothetical Illustration

SELIGMAN 

SELIGMAN HARVESTER

| Prepared for: | Mr. & Mrs. M.T. Nester |
| --- | --- |
| Prepared by: | Trusted Financial Advisor |
| Date Prepared: | 12/18/98 |
| Portfolio: | H 60-30-10 |
| Withdrawal Plan: | 8% of Initial Investment Increased each year by prior year's change in CPI, and 0% prior year-end portfolio value |

| Initial Investment: | $1,000,000 |
| --- | --- |
| Fixed-Dollar Withdrawal: (indexed for inflation) | $80,000 |
| Fixed-Percent Withdrawal: | 0% |

| FIG.7C-1 |
| --- |
| FIG.7C-2 |

FIG.7C

Hypothetical Withdrawal Value in Constant Dollars*

| Year-end | worst | | median | | | | best |
| --- | --- | --- | --- | --- | --- | --- | --- |
| | 10% | 25% | 33.3% | 50% | 33.3% | 25% | 10% |
| 1 | $80,000 | $80,000 | $80,000 | $80,000 | $80,000 | $80,000 | $80,000 |

FIG.7C-1

| Year | | | | | | |
|---|---|---|---|---|---|---|
| 2 | $80.00 | $80.00 | $80.00 | $80.00 | $80.00 | $80.00 |
| 3 | $80.00 | $80.00 | $80.00 | $80.00 | $80.00 | $80.00 |
| 4 | $80.00 | $80.00 | $80.00 | $80.00 | $80.00 | $80.00 |
| 5 | $80.00 | $80.00 | $80.00 | $80.00 | $80.00 | $80.00 |
| 6 | $80.00 | $80.00 | $80.00 | $80.00 | $80.00 | $80.00 |
| 7 | $80.00 | $80.00 | $80.00 | $80.00 | $80.00 | $80.00 |
| 8 | $80.00 | $80.00 | $80.00 | $80.00 | $80.00 | $80.00 |
| 9 | $80.00 | $80.00 | $80.00 | $80.00 | $80.00 | $80.00 |
| 10 | $80.00 | $80.00 | $80.00 | $80.00 | $80.00 | $80.00 |
| 11 | $80.00 | $80.00 | $80.00 | $80.00 | $80.00 | $80.00 |
| 12 | $80.00 | $80.00 | $80.00 | $80.00 | $80.00 | $80.00 |
| 13 | $80.00 | $80.00 | $80.00 | $80.00 | $80.00 | $80.00 |
| 14 | $80.00 | $80.00 | $80.00 | $80.00 | $80.00 | $80.00 |
| 15 | $0 | $80.00 | $80.00 | $80.00 | $80.00 | $80.00 |
| 16 | $0 | $80.00 | $80.00 | $80.00 | $80.00 | $80.00 |
| 17 | $0 | $80.00 | $80.00 | $80.00 | $80.00 | $80.00 |
| 18 | $0 | $80.00 | $80.00 | $80.00 | $80.00 | $80.00 |
| 19 | $0 | $80.00 | $80.00 | $80.00 | $80.00 | $80.00 |
| 20 | $0 | $80.00 | $80.00 | $80.00 | $80.00 | $80.00 |
| 21 | $0 | $0 | $80.00 | $80.00 | $80.00 | $80.00 |
| 22 | $0 | $0 | $80.00 | $80.00 | $80.00 | $80.00 |
| 23 | $0 | $0 | $80.00 | $80.00 | $80.00 | $80.00 |
| 24 | $0 | $0 | $80.00 | $80.00 | $80.00 | $80.00 |
| 25 | $0 | $0 | $80.00 | $80.00 | $80.00 | $80.00 |
| 26 | $0 | $0 | $0 | $80.00 | $80.00 | $80.00 |
| 27 | $0 | $0 | $0 | $80.00 | $80.00 | $80.00 |
| 28 | $0 | $0 | $0 | $80.00 | $80.00 | $80.00 |
| 29 | $0 | $0 | $0 | $80.00 | $80.00 | $80.00 |
| 30 | $0 | $0 | $0 | $80.00 | $80.00 | $80.00 |

*Does not reflect the effect of income taxes or taxes on capital gains. Assumes all dividends and capital gains were reinvested. Withdrawals are deflated by the increase in the actual CPI for each hypothetical result.

FIG. 7C-2

Hypothetical Illustration

SELIGMAN 

SELIGMAN HARVESTER

Prepared for: Mr. & Mrs. M.T.Nester
Date Prepared: 12/18/98
Initial Investment: $1,000,000

4% Fixed Dollar Withdrawal
(Percent of initial investment)
(Indexed to inflation)

4% Fixed Percent Withdrawal
(Percent of each year's portfolio value)

Asset Allocation: H 60-30-10

| 60% Equity | 30% Bonds | 10% Cash |
|---|---|---|
| 35% U.S. Large-Cap Stocks | 30% U.S. Corporate Bonds | 10% U.S. Treasure Bills |
| 10% U.S. Small-Cap Stocks | | |
| 15% International Large-Cap Stocks | | |

FIG.8A-1

| FIG.8A-1 |
|---|
| FIG.8A-2 |

FIG.8A

Prepared by:

Trusted Financial Adviser

Seligman Financial Services has supplied this illustration in response to the request of a specific client, and it has been prepared to meet that client's special instructions. It may not be reproduced or used in verbal or written form with other clients. This hypothetical illustration is not a forecast or a projection of future results; it is based on the Monte Carlo Statistical Technique which uses historical data from 1950 to 1997 (in random order) on various asset allocation and withdrawal strategies. The resulting hypothetical returns are based on asset class returns, not specific fund returns. A more detailed explanation of the Monte Carlo Statistical Technique is available by calling Seligman Financial Services at 800-221-2783.

This hypothetical must be accompanied by each recommended Fund's current prospectus, which contains more complete information about sales charges, expenses, and risk factors. Each Fund's rate of return will vary, and the principal value of an investment in any Fund will fluctuate so that shares, an any given day or when redeemed, may be worth more or less than their original cost.

Although common stocks have produced higher historical returns, they may subject principal to greater risk than other types of investments. The stocks of smaller companies may be subject to above-average market fluctuations. There are specific risks associated with global investing, such as currency fluctuations, foreign taxation, differences in financial reporting practices, and changes in political conditions. The securities in which Seligman High-Yield Bond Fund invests are subject to a greater risk of loss of principal and interest than higher rated investment-grade bonds.

FIG.8A-2

SELIGMAN 

SELIGMAN HARVESTER

Hypothetical Illustration

Prepared for: Mr. & Mrs. M.T. Nester
Prepared by: Trusted Financial Advisor
Date Prepared: 12/18/98
Portfolio: H 60-30-10
Withdrawal Plan: 4% of Initial Investment Increased each year by prior year's change in CPI, and 4% prior year –end portfolio value Initial Investment: $1,000,000
Fixed-Dollar Withdrawal: (indexed for inflation) $40,000
Fixed-Percent Withdrawal: 4%

| FIG.8B-1 |
| FIG.8B-2 |

FIG.8B

Hypothetical Portfolio Value*

| | worst | 10% | 25% | 33.3% | median 50% | 33.3% | 25% | best 10% |
|---|---|---|---|---|---|---|---|---|
| Year-end | | | | | | | | |
| 1 | $882,191 | $944,876 | $977,423 | $1,031,518 | $1,081,649 | $1,100,949 | $1,165,435 | |

FIG.8B-1

| | | | | | |
|---|---|---|---|---|---|
| 2 | $854,148 | $947,259 | | $1,058,242 | $1,127,255 | $1,262,505 |
| 3 | $832,040 | $944,125 | $983,210 | $1,078,583 | $1,168,787 | $1,354,554 |
| 4 | $813,830 | $942,149 | $992,674 | $1,103,022 | $1,213,692 | $1,446,897 |
| 5 | $792,324 | $939,173 | $996,732 | $1,123,023 | $1,261,972 | $1,636,272 |
| 6 | $763,249 | $934,215 | $1,001,646 | $1,153,922 | $1,304,627 | $1,619,465 |
| 7 | $740,373 | $928,895 | $1,009,555 | $1,172,252 | $1,345,685 | $1,712,025 |
| 8 | $720,340 | $922,629 | $1,016,657 | $1,186,507 | $1,383,094 | $1,813,004 |
| 9 | $692,723 | $913,218 | $1,017,896 | $1,205,470 | $1,420,790 | $1,909,331 |
| 10 | $666,793 | $894,486 | $1,015,463 | $1,222,233 | $1,459,561 | $2,020,531 |
| 11 | $631,151 | $890,654 | $1,011,785 | $1,239,880 | $1,495,167 | $2,142,377 |
| 12 | $592,035 | $868,177 | $1,012,360 | $1,254,233 | $1,541,491 | $2,249,344 |
| 13 | $548,372 | $851,092 | $1,001,223 | $1,264,482 | $1,578,244 | $2,375,271 |
| 14 | $497,012 | $823,377 | $990,277 | $1,273,279 | $1,615,114 | $2,509,797 |
| 15 | $446,497 | $795,993 | $969,833 | $1,276,561 | $1,645,930 | $2,631,546 |
| 16 | $389,354 | $755,366 | $960,710 | $1,274,595 | $1,669,088 | $2,749,933 |
| 17 | $317,065 | $722,276 | $931,178 | $1,272,681 | $1,705,591 | $2,892,300 |
| 18 | $246,797 | $678,588 | $899,193 | $1,265,259 | $1,750,146 | $3,031,773 |
| 19 | $164,273 | $623,210 | $862,419 | $1,242,800 | $1,767,594 | $3,160,155 |
| 20 | $72,176 | $558,492 | $823,055 | $1,231,574 | $1,787,969 | $3,353,314 |
| 21 | $0 | $495,531 | $785,203 | $1,218,260 | $1,812,213 | $3,504,660 |
| 22 | $0 | $423,888 | $727,907 | $1,189,019 | $1,825,809 | $3,704,715 |
| 23 | $0 | $343,031 | $660,861 | $1,139,912 | $1,859,426 | $3,868,713 |
| 24 | $0 | $253,429 | $589,888 | $1,107,115 | $1,882,761 | $4,007,877 |
| 25 | $0 | $149,622 | $506,466 | $1,064,177 | $1,893,299 | $4,236,930 |
| 26 | $0 | $35,989 | $425,168 | $999,625 | $1,896,900 | $4,460,488 |
| 27 | $0 | $0 | $322,038 | $950,829 | $1,906,208 | $4,700,890 |
| 28 | $0 | $0 | $215,356 | $891,375 | $1,901,023 | $4,903,494 |
| 29 | $0 | $0 | $89,142 | $812,882 | $1,889,317 | $5,167,591 |
| 30 | $0 | $0 | $0 | $710,135 | $1,879,119 | $5,345,616 |

*Does not reflect the effect of income taxes or taxes on capital gains. Assumes all dividends and capital gains were reinvested.

FIG.8B-2

SELIGMAN 

SELIGMAN HARVESTER

Hypothetical Illustration

| | |
|---|---|
| Prepared for: | Mr. & Mrs. M.T. Nester |
| Prepared by: | Trusted Financial Advisor |
| Date Prepared: | 12/18/98 |
| Portfolio: | H 60-30-10 |
| Withdrawal Plan: | 4% of Initial Investment increased each year by prior year's change in CPI, and 4% prior year –end portfolio value |

| | |
|---|---|
| Initial Investment: | $1,000,000 |
| Fixed-Dollar Withdrawal: (indexed for inflation) | $40,000 |
| Fixed-Percent Withdrawal: | 4% |

Hypothetical Withdrawal Value in Constant Dollars*

| | worst | | median | | | | best |
|---|---|---|---|---|---|---|---|
| | | 10% | 25% | 33.3% | 50% | 33.3% | 25% | 10% |
| Year-end | | | | | | | | |
| 1 | $80,000 | $80,000 | $80,000 | $80,000 | $80,000 | $80,000 | $80,000 |

| FIG.8C-1 |
|---|
| FIG.8C-2 |

| | | | | | | |
|---|---|---|---|---|---|---|
| 2 | $73,709 | $76,407 | $77,251 | $79,871 | $81,627 | $82,942 | $85,120 |
| 3 | $70,612 | $74,711 | $76,427 | $79,301 | $82,227 | $83,790 | $87,748 |
| 4 | $68,220 | $73,154 | $75,175 | $78,685 | $82,156 | $84,162 | $89,722 |
| 5 | $66,350 | $71,659 | $73,863 | $77,988 | $82,211 | $84,780 | $91,486 |
| 6 | $64,652 | $70,256 | $72,670 | $77,276 | $82,027 | $85,031 | $92,553 |
| 7 | $62,791 | $68,780 | $71,516 | $76,621 | $82,026 | $85,050 | $93,835 |
| 8 | $61,135 | $67,552 | $70,391 | $75,949 | $81,772 | $85,358 | $94,916 |
| 9 | $59,507 | $66,207 | $69,311 | $74,913 | $81,282 | $85,279 | $96,443 |
| 10 | $57,778 | $64,948 | $68,073 | $74,210 | $80,886 | $85,157 | $97,037 |
| 11 | $56,488 | $63,515 | $66,826 | $73,242 | $80,594 | $85,077 | $97,893 |
| 12 | $54,929 | $62,375 | $65,660 | $72,393 | $79,844 | $84,710 | $99,663 |
| 13 | $53,470 | $60,819 | $64,305 | $71,642 | $79,864 | $84,865 | $100,506 |
| 14 | $52,021 | $59,471 | $63,044 | $70,691 | $79,271 | $84,485 | $102,038 |
| 15 | $50,331 | $58,132 | $62,013 | $69,759 | $78,630 | $84,663 | $102,845 |
| 16 | $48,648 | $56,844 | $60,682 | $68,721 | $77,830 | $84,080 | $103,732 |
| 17 | $47,159 | $55,422 | $59,285 | $67,484 | $77,209 | $83,619 | $104,615 |
| 18 | $45,430 | $53,919 | $57,941 | $66,273 | $76,565 | $83,523 | $105,872 |
| 19 | $43,735 | $52,658 | $56,687 | $65,212 | $75,874 | $83,431 | $107,049 |
| 20 | $42,163 | $51,203 | $55,187 | $64,052 | $75,017 | $82,701 | $107,592 |
| 21 | $12,269 | $49,683 | $53,766 | $62,682 | $74,102 | $82,217 | $109,439 |
| 22 | $0 | $48,155 | $52,251 | $61,585 | $73,368 | $81,621 | $109,644 |
| 23 | $0 | $46,650 | $50,770 | $60,354 | $72,731 | $81,400 | $111,278 |
| 24 | $0 | $45,083 | $49,252 | $58,947 | $71,806 | $81,444 | $111,363 |
| 25 | $0 | $43,561 | $47,618 | $57,665 | $70,733 | $80,685 | $110,667 |
| 26 | $0 | $41,873 | $46,073 | $56,310 | $70,256 | $80,216 | $113,192 |
| 27 | $0 | $5,339 | $44,530 | $55,127 | $69,531 | $79,646 | $114,277 |
| 28 | $0 | $0 | $42,806 | $53,808 | $68,229 | $78,757 | $113,510 |
| 29 | $0 | $0 | $30,254 | $52,381 | $67,433 | $78,015 | $114,007 |
| 30 | $0 | $0 | $0 | $50,863 | $66,205 | $77,682 | $115,656 |

*Does not reflect the effect of income taxes or taxes on capital gains. Assumes all dividends and capital gains were reinvested. Withdrawals are deflated by the increase in the actual CPI for each hypothetical result.

FIG. 8C-2

METHOD OF RISK MANAGEMENT AND OF ACHIEVING A RECOMMENDED ASSET ALLOCATION AND WITHDRAWAL STRATEGY, AND COMPUTER-READABLE MEDIUM, APPARATUS AND COMPUTER PROGRAM THEREOF

FIELD OF THE INVENTION

This invention to a method and apparatus for determining an asset allocation and withdrawal strategy—the SELIGMAN HARVESTER® risk management. system and apparatus—for those that are using a pool of assets over a period of time. (SELIGMAN HARVESTER® is a registered trademark of Seligman Advisors, Inc.) The invention has a broad range of applications to individuals as well as foundations, corporations, partnerships or any other entity, and is particularly applicable to retirees seeking to sustain a standard of living for the remainder of their lifetime based on their wealth accumulated over the course of their working life. The invention can also be applied, for example, to a pool of assets derived from an inheritance, winning a large sum of money, earning a large sum of money over a short period of time, the assets of a foundation or any pool of assets where there is a risk of depleting the asset base while withdrawing income over time. The method and apparatus of the present invention have applications to local area networks (LAN) or wide area networks (WAN), such as the Internet, as well as conventional communications systems such as electronic mail, facsimile and voice telephony.

BACKGROUND OF THE INVENTION

Managing an asset pool in terms of a recommended asset and withdrawal strategy is a problem encountered by individuals, foundations or other entities in a variety of circumstances. For example, this problem is often encountered by a retiree, an individual who has stopped working but has not stopped paying bills. Such an individual has grown accustomed to a certain standard of living and needs the resources to maintain it—as well as pursue the dreams the individual now has time for. The individual is about to start gathering income by harvesting from a portfolio of assets, for example the wealth accumulated during their working life. At this stage, one of the greatest risks the individual faces is outliving their accumulated wealth.

The invention—the SELIGMAN HARVESTER® risk management system and apparatus—provides a methodology for seeking investment solutions that retirees can live with right now, as well as 10, 20, or 30 years from now or for any time period. The invention is based on the interaction of: (1) a hypothetical distribution of investment outcomes for a specific asset allocation, and (2) specified fixed dollar and fixed percent withdrawal amounts to generate a hypothetical illustration of a distribution of possible portfolio values and withdrawal amounts over a designated time period to facilitate a recommended asset allocation and withdrawal strategy. The hypothetical distribution of investment outcomes is generated using a "Monte Carlo" ("MC") software program which utilizes a random number generator and the actual rate of inflation ("CPI") for each year going back to 1950 and the actual, year-by-year total returns for 75 different portfolios with different mixes of Domestic Large Cap, Mid Cap, and Small Cap stocks; International Large Cap, Mid Cap, Small Cap and Emerging Markets stocks; Corporate, Government and Inflation Index Bonds; and 30-Day Treasury Bills. In other words, the MC program selected the year-by-year actual returns in random order and then linked the corresponding returns for each of the 75 different portfolios.

Other authors have applied MC software programming to investment planning using an assumed average rate of return and an assumed standard deviation for each of the variables. See, e.g., Robert N. Veres, "The Monte Carlo Solution," *Dow Jones Investment Advisor* at 35–38 (May 1996); Christopher J. Cordaro, "Using Monte Carlo Simulations for Retirement Planning," *Retirement Planning* at 39–44 (July–August 1998). Veres also suggests using an existing optimizer program to calculate for a given asset mix, a historical average rate of return and standard deviation. For example, Veres says that the financial advisor can "run probability analyses on their optimizers to get a mean return and standard deviation. They can assume 3% annual inflation with a standard deviation of 1% or so . . . . " Veres, page 36, column 2.

Thus, the approaches used by both Veres and Cordaro apply the MC software to generate the distribution of possible returns given the specified mean return and standard deviation. In contrast, by using the actual year-by-year returns (and limiting the MC software program to selecting the order of the years, and not generating the actual returns), the invention captures all of the cross correlations among the various asset classes in each year, and also relates them to the actual CPI for each year.

The invention interacts a hypothetical distribution of investment outcomes for a specific asset allocation with specified fixed dollar and fixed percent withdrawal amounts to generate a hypothetical illustration of a distribution of possible portfolio values and withdrawal amounts over a designated time period to facilitate a recommended asset allocation and withdrawal strategy. By using actual year-by-year returns for each portfolio and using the MC software only to randomly generate the sequence of years, thereby deriving a distribution of investment outcomes, the invention generates for a given withdrawal strategy a hypothetical illustration of a distribution of possible portfolio values and withdrawal amounts on an annual, quarterly or other basis, with probabilities for each time interval ranging from the worst case scenario to the best case scenario, e.g., the worst 10% to the best 10%.

The withdrawal strategy of the invention uses combinations of fixed dollar and fixed percent withdrawals and interacts them with the hypothetical distribution of investment outcomes for a specific asset allocation to generate a hypothetical illustration of year-by-year portfolio values and year-by-year withdrawal amounts, i.e., the Hypothetical Illustrator of the invention. In addition, the fixed dollar withdrawals of the present invention are increased or decreased by the change in CPI for the prior year, as selected by the MC software. As a consequence, the increase in the fixed-dollar withdrawal in any one-year also varies probabilistically according to the simulation results. In addition, the fixed percent withdrawal is based on year end portfolio values as given by the distribution of investment outcomes for each year. As a consequence, the actual dollar value of the fixed percent withdrawal in any one year also varies probabilistically according to the invention results.

The methodology disclosed by other authors differs markedly from the invention in that they only disclose fixed withdrawal amounts increased by an assumed inflation rate. See, e.g., Veres; Cordaro; Philip L. Cooley et al., "Sustainable Withdrawal Rates From Your Retirement Portfolio," Department of Business Administration, Trinity University, San Antonio, Tex. 78212-7200; William P. Bengen, "Conserving Client Portfolios During Retirement, Part III", *Journal Of Financial Planning* at 84–97 (December 1997); James K. Kennedy et al., "How Much Is Enough? A Guide To Planning A Retirement Portfolio," *Journal Of Financial Planning* at 82–87 (June 1998). For example, in the Cordaro case for Bob and Carol Sample, in 2009, their withdrawal is $42,947. That withdrawal is increased by 3% a year, which is the assumed rate of inflation. Cordaro at 41, Exhibit 1. The amount of money withdrawn has no relation to the value of the portfolio.

OBJECTS OF THE INVENTION

It is an object of the invention to provide a new and improved method and apparatus for determining a recommended asset allocation and withdrawal strategy for any pool of assets where there is a risk of depleting the asset base while gathering income over time.

It is also an object of the invention to provide a new and improved method and apparatus for deriving a hypothetical distribution of investment outcomes for a specific asset allocation generated using a Monte Carlo software program which utilizes a random number generator and the historical rate of inflation and historical rate of return for a variety of portfolios of asset classes.

It is a further object of the invention to provide a hypothetical distribution of investment outcomes using actual returns (and limiting the software to selecting the order of years, and not generating the actual returns) in order to capture all of the cross correlations among the various asset classes in each year, and also relate them to the actual CPI for each year.

It is still a further object of the invention to provide a new and improved method for determining a withdrawal strategy based on a combination of specified fixed dollar and fixed percent withdrawals.

It is another object of the invention to interact the hypothetical distribution of investment outcomes for a specific asset allocation with specified fixed dollar and fixed percent withdrawals to generate a hypothetical illustration of a distribution of possible portfolio values and withdrawal amounts over a designated time period to facilitate a recommended asset allocation and withdrawal strategy.

Still another object of the invention is to provide a Hypothetical Illustrator which, upon receiving information showing the initial investment of a client, specific combinations of fixed dollar and fixed percent withdrawals and a specific asset allocation, generates a hypothetical illustration that exhibits the probability of various outcomes on an annual, quarterly or other basis for a designated time period, thereby facilitating a recommended asset allocation and withdrawal strategy.

The foregoing specific objects and advantages of this invention are illustrative of those which can be achieved by the present invention and are not intended to be exhaustive or limiting of the possible advantages which can be realized. Thus, these and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

SUMMARY OF THE INVENTION

The above-mentioned and other objects of the invention are met by a new and improved method and apparatus, i.e., the SELIGMAN HARVESTER® risk management system and apparatus, for generating a hypothetical illustration of a distribution of possible portfolio values and withdrawal amounts over a designated time period to facilitate a recommended asset allocation and withdrawal strategy. The hypothetical illustration of the invention is generated by the method and apparatus of the invention which interacts: (1) a hypothetical distribution of investment outcomes for a specific asset allocation; and (2) specified fixed dollar and fixed percent withdrawals.

The hypothetical distribution of investment outcomes of the invention uses actual returns for a variety of portfolios and the actual CPI on an annual, quarterly or other basis for a historical period of up to 10, 20 or 30 years or longer, for example, 1950 to present. The method and apparatus of the invention generates the hypothetical distribution of investment outcomes by randomly selecting the order of the years and linking the corresponding actual returns for each of the portfolios. Each portfolio (i.e., asset allocation), therefore, has its own unique hypothetical distribution of investment outcomes.

The invention also is directed to a new method for determining a withdrawal strategy. The invention uses a combination of fixed dollar and fixed percent withdrawals and interacts them with the hypothetical distribution of investment outcomes for a specific to generate a portfolio hypothetical illustration of a distribution of possible portfolio values and withdrawal amounts over a designated time period.

By inputting into the Hypothetical Illustrator of the invention (1) the initial investment of a client, (2) a combination of fixed dollar and fixed percent withdrawals and (3) a specific asset allocation, the invention generates a hypothetical illustration of a distribution of possible portfolio values and withdrawal amounts on an annual, quarterly or other basis over a designated time period. For example, in the case of a retiree, the designated time period corresponds to the life expectancy of the individual, e.g., 30 years. The distributions of hypothetical results are illustrated, for example, from the worst 10% of the time, to the best 10% of the time, to enable the client to make an informed selection of an appropriate asset allocation and withdrawal strategy.

The invention is further directed to a computer readable medium having computer executable software code stored thereon for (1) determining a hypothetical distribution of investment outcomes for a specific portfolio, (2) interacting the hypothetical distribution of investment outcomes with a combination of fixed dollar and fixed percent withdrawals and/or (3) generating a hypothetical illustration of a distribution of possible portfolio values and withdrawal amounts over a designated time period, to facilitate a recommended asset allocation and withdrawal strategy.

Given a specific recommended asset allocation and withdrawal strategy, the method and apparatus of the invention can be used to select a withdrawal strategy and asset allocation that best balances the desire for income with the risk of running out of money and is therefore suitable for a specific client given their individual financial situation and financial obligations. For example, in one embodiment, the invention allows the user to input: (1) the client's name; (2) the date; (3) the client's initial investment (e.g., their total investable assets); (4) the advisor's name; (5) a specific fixed dollar withdrawal; (6) a specific fixed percent withdrawal;

and (7) a specific asset allocation. The invention then generates a hypothetical illustration of a distribution of possible portfolio values and withdrawal amounts on an annual basis for 30 years, from the worst 10% of the time, to the best 10% of the time. By varying the specified fixed dollar withdrawal, and/or the specified fixed percent withdrawal and/or the specified asset allocation, an individual can determine a hypothetical illustration of a distribution of possible portfolio values and withdrawal amounts for each combination, and thereby make an informed selection of the strategy most suitable for themselves.

It will be appreciated by those skilled in the art that the foregoing brief description and the following detailed description are exemplary and explanatory of this invention, but are not intended to be restrictive thereof or limiting of the advantages which can be achieved by this invention. Thus, the accompanying drawings, referred to herein and constituting a part hereof, illustrate preferred embodiments of this invention and, together with the detailed description, serve to explain the principles of this invention.

BRIEF DESCRIPTION OF THE DRAWINGS

The above and other objects, features and advantages of this invention will be apparent from the following detailed description, especially when taken in conjunction with the accompanying drawings, wherein:

FIGS. 1A–1C are an exemplary SELIGMAN HARVESTER® Workbook form for determining a client's fixed dollar withdrawal, fixed percent withdrawal and total withdrawal.

FIG. 2 is an exemplary SELIGMAN HARVESTER® Proposal Request Form for use with the Hypothetical Illustrator of the invention.

FIGS. 6A–6C are an example of the results output from the Hypothetical Illustrator for a designated time period of 30 years based on an initial investment of $1,000,000, a 6% fixed dollar withdrawal, a 2% fixed percent withdrawal and a 60-30-10 asset allocation.

FIGS. 7A–7C are an example of the results output from the Hypothetical Illustrator for a designated time period of 30 years based on an initial investment of $1,000,000, an 8% fixed dollar withdrawal, a 0% fixed percent withdrawal and a 60-30-10 asset allocation.

FIGS. 8A–8C are an example of the results output from the Hypothetical Illustrator for a designated time period of 30 years based on an initial investment of $1,000,000, a 4% fixed dollar withdrawal, a 4% fixed percent withdrawal and a 60-30-10 asset allocation.

DETAILED DESCRIPTION OF THE EMBODIMENTS

Figure 3A:
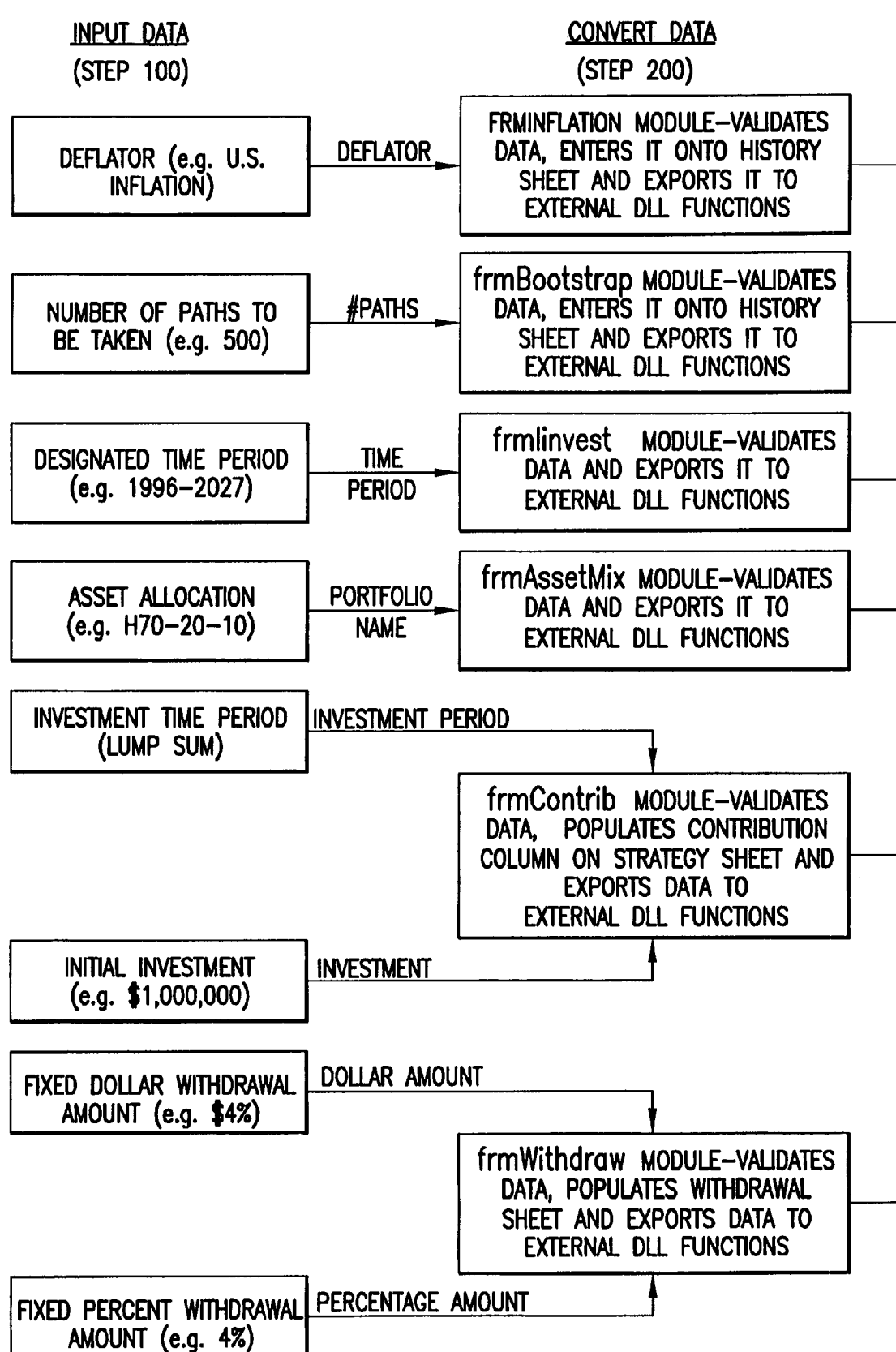
FIG. 3 is an exemplary flow chart illustrating the steps for generating a hypothetical distribution of investment outcomes for a specific asset allocation and conversion of the hypothetical distribution of investment outcomes into a withdrawal worksheet and portfolio values worksheet for use in the Hypothetical Illustrator.

A. The Hypothetical Distribution Of Investment Outcomes

Hypothetical illustrations are a widely used tool for illustrating how any given investment strategy has worked over stated periods of up to 20 years (e.g., 1977–1997) and longer. Typical illustrations include showing how the use of a systematic investment plan, such as dollar-cost averaging, has worked in a particular mutual fund, or even an asset class, such as "large-cap stocks" as illustrated by the Standard & Poor's 500. The traditional hypothetical's most obvious limitation—that past performance is no guarantee of future results—must be, and is, clearly stated.

In addition, there are other, more subtle, limitations that are important considerations. Most hypotheticals today are based on the last 10 or 20 years, which is the intuitive reference time frame for a typical investor. The last 20 years, however, may be misleading because they are the best 20 years for the S&P 500 since 1950. An alternative may be developing a hypothetical illustration based on a clearly stated average rate of return for a longer period of time, say the entire 1950 through present period, and then applying this average over a stated period of time. But, an average return implies that, historically, the investor did as well as the hypothetical only half of the time.

These limitations are accentuated for individuals who are relying on their assets to maintain their standard of living, and are, therefore, withdrawing money on a systematic basis. In this case, the use of average returns can be highly misleading. For example, the average annual rate of return for the S&P 500 from 1950 through 1997 is 13.17%. An annual withdrawal of 10% of the initial investment (e.g., $50,000 a year based on an initial $500,000 investment in the S&P 500) would therefore seem to have a margin of safety of three percentage points. But, such an approach is anything but safe. An investor following such a strategy would have actually run out of money in 20 years or less in 13 of the 29, 20-year periods going back to 1950 (i.e., 1950–1969, 1951–1970, etc.). In six instances, they would have had less than their initial $500,000 investment. In only 10 of the 29, 20-year periods would this strategy have produced a result in which the initial nest egg was intact at the end of 20 years.

Despite these limitations, the fact remains that historical experiences provide the only assistance in assessing the appropriateness of any given investment strategy for the future. An alternative form of a hypothetical illustration would, therefore, use the historical experience to provide the financial advisor and potential investor with a sense of the historic probabilities or chances of a series of outcomes for a specified investment strategy.

The invention uses the actual historical data to develop the distribution of probabilities of various hypothetical outcomes. This approach was used by the inventors to develop hypothetical illustrations using various asset allocations and withdrawal strategies based on the historical experience from 1950 to present.

For this approach to work, the inventors first determined through preliminary research that there had been no serial correlation in the investment returns. This means that what happens in any one year provides no information on what will happen in subsequent years. For example, at the end of 1996, the S&P 500 had recorded two consecutive years of 20% plus returns. The S&P 500 had never posted three consecutive years of 20-percent-plus returns. Based on that information, it would have been unexpected that, in 1997, the S&P 500 would produce a total return of 33.4%. Despite the fact that the S&P 500 had never produced three straight years of 20-percent plus returns, the S&P 500 went on to produce a total return over 28% in 1998. This lack of a serial correlation is popularly known as the "random walk," and has been widely shown and documented in academic literature.

The practical implication of these findings is that statistically, any one year is as likely to follow any other year. As a consequence, instead of assuming the average return and the shape of the distribution of possible outcomes, they can be derived based on doing multiple simulations using the actual year-by-year returns for the period 1950 through present in which the sequence of the years is random. For example, the first Monte Carlo simulation will randomly select the years in a different order. By doing 10,000 such simulations, the inventors were able to show a full range of hypothetical outcomes, from the lowest 10 percent, to the average, to the highest 10 percent.

To accomplish this result, the inventors created 100 different portfolios with different mixes of Domestic Large Cap, Mid Cap, and Small Cap stocks; Large Cap, Mid Cap, Small Cap and Emerging Markets International stocks; Corporate, Government and Inflation Index Bonds; and 30-Day Treasury Bills. The range of initial allocations used is summarized in Table 1 below.

TABLE 1

Range Of Initial Allocations Using Monte Carlo Simulations

|  | Lowest Allocation | Highest Allocation |
| --- | --- | --- |
| U.S. | | |
| Large-Cap | 0% | 100% |
| Mid-Cap | 0 | 15 |
| Small-Cap | 0 | 100 |
| International | | |
| Large-Cap | 0% | 100% |
| Mid-Cap | 0 | 20 |
| Small-Cap | 0 | 10 |
| Emerging Markets | 0 | 15 |
| Fixed Income | | |
| US Long-Term Corporate Bond | 0% | 100% |
| US Government Bonds | 0 | 100 |
| Inflation Index Bonds | 0 | 10 |
| U.S. 30-Day Treasury Bill | 0% | 100% |

Where data were available, the inventors used standard sources (e.g., the S&P 500 for U.S. large cap). Where data were not available, the inventors created estimates of those returns (shown in Table 2, below). For example, for the period 1970–1997, the inventors used EAFE for International Large Cap. Prior to 1970, the inventors used the S&P 500 as the EAFE proxy.

TABLE 2

Description of Asset Classes

| | |
| --- | --- |
| US Small-Company Stocks: | NYSE Fifth Quintile Returns (1950–1981); Dimensional Fund Advisors Small Company Fund (1982–1997) |

TABLE 2-continued

Description of Asset Classes

| | |
| --- | --- |
| US Medium-Company Stocks: | 1979–1997: Russell Midcap Index; 1950–1978: Estimated as the midpoint between the total return for the Ibbotson Small Stock Index and the Standard & Poor's 500 Composite Stock Price Index |
| US Large-Company Stocks: | Standard & Poor's 500 Composite Stock Index (S&P 500) |
| International Small-Company Stocks: | 1986–1987: NatWest Securities Ltd. (NWSL) global ex. U.S. Smaller Companies Index; 1970–1985: Estimated as the difference between the MSCI EAFE Index and the S&P 500, added to the Ibbotson Small Stock Index; 1950–1969: Estimated as the Ibbotson Small Stock Index |
| Emerging Markets: | 1989–1997: IFC Investables Composite; 1985–1988: IFC Global Emerging Composite; 1970–1984: Estimated as the difference between the MSCI EAFE Index and the S&P 500, added to the Ibbotson Small Stock Index; 1950–1969: Estimated as the Ibbotson Small Stock Index |
| International Medium-Company Stocks: | 1986–1997: Financial Times Actuaries World Indices/Standard & Poor's (FTAWI/S&P) World ex. U.S. Medium-Small Cap Index; 1970–1985: Estimated as the difference between the MSCI EAFE Index and the S&P 500, added to the Ibbotson Small Stock Index; 1950–1969: Estimated as the Ibbotson Small Stock Index |
| International Large-Company Stocks: | 1970–1997: Morgan Stanley Capital International (MCSI) Europe Australia and Far East (EAFE) Index; 1950–1969: Estimated as the Standard & Poor's 500 Composite Stock Price Index |
| US Corporate Bonds: | Salomon Brothers Long-Term High Grade Corporate Bond Index |
| US Government Bonds: | 1950–1997: Ibbotson "One Bond" Portfolio. To the greatest extent possible, each year, a one-bond portfolio with a term of approximately 20 years and a reasonably current coupon, and whose returns did not reflect potential tax benefits, impaired negotiability, or special redemption or call privileges, was used |
| Inflation: | Consumer Price Index (1950–1977); Consumer Price Index for All Urban Consumers (1978–1997) |

The inventors added to the database the actual CPI for each year going back to 1950. They then calculated the actual, year-by-year total returns for each of these portfolios. In any one year, their respective returns varied based on the different asset mixes.

Next, the inventors used an MC random number generator to select the year-by-year actual returns in random order. In other words, the MC program determined the order of the years, and then linked the actual returns for each of the 100 portfolios. Using the MC technique, the inventors first did 1000 runs, then 2000 runs and then 10,000 runs. Each run was based on a random order of the entire data set, 1950-present. Based on the 10,000 results, the inventors derived a hypothetical distribution of outcomes on a year-by-year basis for 30 years. A hypothetical distribution of outcomes can be derived based on an annual, quarterly or other basis for any time period using the invention, e.g., 10, 20 or 30 years or longer, preferably 1950 to present.

The hypothetical distributions of year-by-year outcomes were initially generated for more than 100 portfolios. Based on their research and business judgment, the inventors reduced that to approximately 75 portfolios. The range of allocations for those 75 portfolios is summarized in Table 3 below.

TABLE 3

Range Of Allocations Used In Final Monte Carlo Simulations

| | Lowest Allocation | Highest Allocation |
|---|---|---|
| U.S. | | |
| Large-Cap | 20 | 100 |
| Mid-Cap | 0 | 15 |
| Small-Cap | 0 | 40 |
| International | | |
| Large-Cap | 0 | 35 |
| Mid-Cap | 0 | 20 |
| Small-Cap | 0 | 10 |
| Emerging Markets | 0 | 15 |
| Fixed Income | | |
| US Long-Term Corporate Bond | 0 | 60 |
| US Government Bonds | 0 | 0 |
| Inflation Index Bonds | 0 | 0 |
| U.S. 30-Day Treasury Bill | 0 | 10 |

By using the actual year-by-year returns (and limiting the MC program to selecting the order of the years, and not generating the actual returns), the invention captures all of the cross correlations among the various asset classes in each year, and also relates the actual CPI for each year. The Monte Carlo program is but one approach that can be utilized to achieve this result. However, any software program which can capture the cross correlations among the various asset classes in each year and relate the actual CPI for each year can be utilized in the invention.

B. The Asset Allocation and Withdrawal Strategy

The invention interacts the various hypothetical outcomes for each portfolio with various withdrawal strategies. The invention uses a combination of fixed-dollar and fixed-percent withdrawals and interacts them with a hypothetical distribution of investment outcomes for a specific asset allocation to generate a hypothetical illustration of year-by-year portfolio values and year-by-year withdrawals. In addition, the fixed dollar withdrawals are increased by the change in the CPI for the prior year as selected by the MC program. As a consequence, the increase in the fixed-dollar withdrawal in any one-year also varies probabilistically according to the simulation results.

After more than 15 million simulations using different withdrawal strategies with different asset allocations to generate various hypothetical illustrations of year-by-year portfolio values and withdrawal amounts, the hypothetical results from these simulations were then used to guide in the development of specific asset allocation and withdrawal strategies. The following asset allocation and withdrawal strategies are not intended in any way to limit the invention which can be applied using any fixed dollar or fixed percent withdrawal and/or asset allocation selected by a client or their advisor in view of the client's financial situation.

In reviewing and analyzing these results, three key design criteria were used. In order of importance, they were:

1. Survivorship

The combination of the various withdrawal strategies and asset allocations had to last; that is, the portfolio could not run out of money:

90% of the time for at least 20 years,

75% of the time for at least 25 years, 66.7% of the time for at least 30 years.

2. Minimum Reliable Income

Attempting to meet the total withdrawal for the entire fixed-dollar need with reliable dividend and interest income forced a reduction in the equity allocations to levels that increased the risk of running out of money over the longer term. Too often, the lack of growth in capital and income was overwhelmed by inflation increasing the fixed-dollar withdrawal. As a result, the minimum level of reliable dividend and interest income was set at half of the initial fixed-dollar need. In the cases where the hypothetical results of two asset mixes were indistinguishable statistically, the inventors chose the asset mix with the higher cash-flow yield.

3. Volatility

Because they are withdrawing money, volatility accentuates risk for an individual. Therefore, the third criterion in designing the portfolios was that they have less than the S&P 500's volatility. Once again, in the cases where the hypothetical results and cash-flow yields were indistinguishable statistically, the inventors chose the asset mix with the lower annual standard deviation of returns.

Based on this research, the inventors discovered that the survival rate is highly dependent upon the manner in which the money is withdrawn. Fixed-dollar withdrawals significantly increase the risk of running out of money. The maximum whole number fixed-dollar withdrawal indexed for inflation that lasts at least 20 years, 90% of the time is six percent.

The inventors discovered that by reducing the fixed dollar withdrawal by one percentage point, they could increase the fixed percent withdrawal by two percentage points, for a net one percentage point increase in the total withdrawals and still meet the survivorship criteria specified above. Based on the foregoing criteria, a fixed dollar/fixed percent withdrawal strategy is exemplified in Table 4 below.

TABLE 4

| Fixed Dollar (Indexed for Inflation) | Fixed Percentage (of the total portfolio) | Total Annual Withdrawal |
|---|---|---|
| 6% | 0% | 6% |
| 5% | 2% | 7% |
| 4% | 4% | 8% |
| 3% | 6% | 9% |
| 2% | 8% | 10% |

As shown in Table 4, for every decrease in one percentage point of a fixed dollar withdrawal (ranging from a maximum of 6% to a minimum of 2%), the fixed percent withdrawal increases by 2% (ranging from a minimum of 0% to a maximum of 8%).

Based on their research results, the inventors also learned that the smaller the fixed-dollar withdrawal, the greater the appropriate reliance on equity investments relative to fixed-income investments. Based on all three criteria, a 6/0 (6% fixed dollar, 0% fixed percentage) withdrawal strategy worked best with a 60% equity, 30% fixed income, 10% cash allocation. However, a 2/8 withdrawal strategy works best with an 0.80% equity, 10% fixed income, 10% cash allocation.

The research results also showed that:

Small-cap allocations of greater than 10% introduced excessive volatility and risk during the first five years of all of the simulations, using the above withdrawal strategies.

International investing provided important diversification to protect against downside risk. The MC analysis pointed to an international equity allocation in excess of 50% of the total equity. However, this result was driven by the experience of the 1970s. Therefore, based on various efficient frontier analyses, the inventors limited the international equity allocation to no more than 25% of equities.

As a consequence of this research, the inventors developed the following methodology for determining a withdrawal strategy and an asset allocation for an entity or individual that is using a pool of assets to sustain a standard of living. The methodology is applicable to individuals as well as foundations. The following 10 steps are illustrated in the exemplary SELIGMAN HARVESTER® Workbook shown in FIGS. 1A–1D:

1) Calculate or identify the total investable assets.

2) Calculate or identify income from Social Security, pensions and the like.

3) Identify and total those expenses that must be met. This would include such items as paying the mortgage or rent, paying taxes, providing health care, and a minimal amount of money to live on. It could also include other fixed obligations, such as a car lease, or country club dues and the like.

4) These fixed dollar expenses are called "needs."

5) Identify and total those expenses that are discretionary. That is, they can be postponed or even eliminated. These include entertainment, travel, eating out, new cars, etc.

6) These flexible expenses are called "wants."

7) Subtract total needs from income to get "net needs."

8) Calculate net needs as a percent of total investable assets to obtain "fixed-dollar withdrawal."

9) Calculate wants as a percent of total investable assets to obtain "fixed-percent withdrawal."

10) Add net needs and wants to calculate total income, and then divide by investable assets to calculate total income as a percent of investable assets.

The inventors also developed a methodology for using these data in the design of an overall withdrawal strategy as follows:

1. Start with a client's needs and wants as a percentage of their total investable assets. To the extent possible, meet the needs of the client with fixed-dollar withdrawals and their wants with more flexible fixed-percentage withdrawals.

2. If the client's needs (fixed-dollar withdrawals) and wants (fixed-percent withdrawals) are close to one of the withdrawal strategies in Table 4, use that solution.

3. If the client's needs and wants do not match up, base the withdrawal strategy on the total initial income requirement; that is, needs plus wants. For example, if a client has needs totaling 6% of investable assets and wants totaling 2%, the total withdrawal would be 8%. Select the withdrawal strategy that totals 8%–4% fixed-dollar and 4% fixed-percentage.

4. If the client's needs and wants are less than 6% of investable assets, choose the mix of fixed-dollar and fixed-percent withdrawals that are most suitable given the client's specific financial situation.

The inventors further developed a methodology for determining an asset allocation as follows:

1. As a general rule, retirees need a portfolio allocation of at least 60% equities to balance the desire for relatively reliable dividend and interest income and growth of capital and income to keep pace with inflation.

2. Approximately 10% of assets should be held in cash or cash equivalents such as US Treasury bills. No one knows the direction of markets over one-year time frames. By setting aside a cash reserve, clients are better prepared to deal with difficult market conditions and unexpected occurrences requiring cash.

3. Seek to meet at least half of a client's fixed-dollar needs with relatively reliable current dividend and interest income. For example, a 6% fixed-dollar need indicates the overall portfolio yield (from dividend and interest income) should be at least 3 percent.

4. Use Small or Mid-Caps stocks to help grow the asset base of a portfolio. However, allocations greater than 10% may create excessive short-term volatility.

5. International investing can help provide important diversification against downside risk. Based on various efficient frontier analyses, allocations of 15% to 25%—mostly from developed economies of Western Europe, Australasia, and the Far East (EAFE)—seem most prudent.

6. In general, the fixed-income allocation can be reduced as a client's fixed-dollar need decreases. A rule of thumb: For every 1% reduction in a client's fixed-dollar need, the fixed-income allocation can be reduced by 5 percentage points, and the large cap equity allocation can be increased by the same 5 percentage points. Of course, the actual allocation depends upon the financial advisor's assessment of suitability for the client.

Based on the foregoing criteria, an asset allocation strategy is exemplified in Table 5 below.

TABLE 5

| Fixed Dollar Need | Interest & Dividend Income Target | Allocation | | |
| --- | --- | --- | --- | --- |
| | | Equity | Fixed Income | Cash |
| 6% | 3.0% | 60 | 30 | 10 |
| 5% | 2.5% | 65 | 25 | 10 |
| 4% | 2.0% | 70 | 20 | 10 |
| 3% | 1.5% | 75 | 15 | 10 |
| 2% | 1.0% | 80 | 10 | 10 |

Thus, following the foregoing preferred criteria, including completion of the SELIGMAN HARVESTER® workbook shown in FIGS. 1A–1D, a client and their advisor can determine a specific asset allocation and withdrawal strategy. A SELIGMAN HARVESTER® Proposal Request Form (FIG. 2) specifies the proposed withdrawal strategy (_____% fixed dollar; _____% fixed percent) and asset allocation. The client/advisor are now in a position to use the Hypothetical Illustrator of the invention to obtain a SELIGMAN HARVESTER® recommended asset allocation and withdrawal strategy.

C. Interaction of the Hypothetical Distribution of Investment Outcomes for a Specific Asset Allocation with a Specified Withdrawal Strategy to Generate a Hypothetical Illustration of the Distribution of Possible Portfolio Values and Withdrawal Amounts A method and apparatus using a software program, i.e., the Hypothetical Illustrator, was developed using Visual Basic and Excel to assist the financial advisor in their recommendation of an asset allocation and withdrawal strategy for an individual client. (The invention is not limited to the use of Visual Basic and Excel software, as any other software capable of performing the following steps can be utilized in the invention.) The Hypothetical Illustrator includes a storage device for down-load/up-load storing of information, including a hypothetical distribution of investment outcomes for a specific asset allocation, so that when an individual inputs specified fixed dollar and fixed percent withdrawal amounts, the Hypothetical Illustrator interacts the fixed dollar and fixed percent withdrawals with the hypothetical distribution of investment outcomes to generate a hypothetical illustration of the distribution of possible portfolio values and withdrawal amounts to facilitate a recommended asset and withdrawal strategy. The specified fixed dollar and fixed percent withdrawals can be directly interacted with a hypothetical distribution of investment outcomes for a specific asset allocation to generate a hypothetical illustration, or interacted with a hypothetical distribution of investment outcomes via withdrawal and/or portfolio values worksheets stored in the Hypothetical Illustrator as explained below.

For example, in one embodiment, the Hypothetical Illustrator of the invention stores a plurality of withdrawal worksheets and portfolio values worksheets each derived from a hypothetical distribution of investment outcomes for a specific asset allocation. Each withdrawal worksheet and portfolio values worksheet corresponds to a specified fixed dollar withdrawal amount, fixed percent withdrawal amount, initial investment and asset allocation for which a hypothetical distribution of investment outcomes is generated. The Hypothetical Illustrator of the invention allows an advisor to input a client's actual initial investment and fixed dollar withdrawal, fixed percent withdrawal and asset allocation preferably determined following the withdrawal and asset allocation criteria set forth in section B above. The software of the Hypothetical Illustrator interacts the fixed dollar withdrawal, fixed percent withdrawal and asset allocation input by the advisor by searching for a match for this information with a specified fixed dollar withdrawal amount, fixed percent withdrawal and asset allocation corresponding to a withdrawal worksheet or a portfolio values worksheet. If a match is found, the Hypothetical Illustrator scales the withdrawal worksheet or portfolio values worksheet based on the actual initial investment input by the advisor and outputs a hypothetical illustration of a distribution of possible withdrawal amounts or portfolio values corresponding to a designated time period of investment, i.e., the illustration is generated on an annual basis for a designated period of 30 years. The hypothetical illustration can be generated for any designated period of time, on an annual, quarterly or other basis and/or in a range from best case scenario to worst case scenario.

Figures 3, 3B:
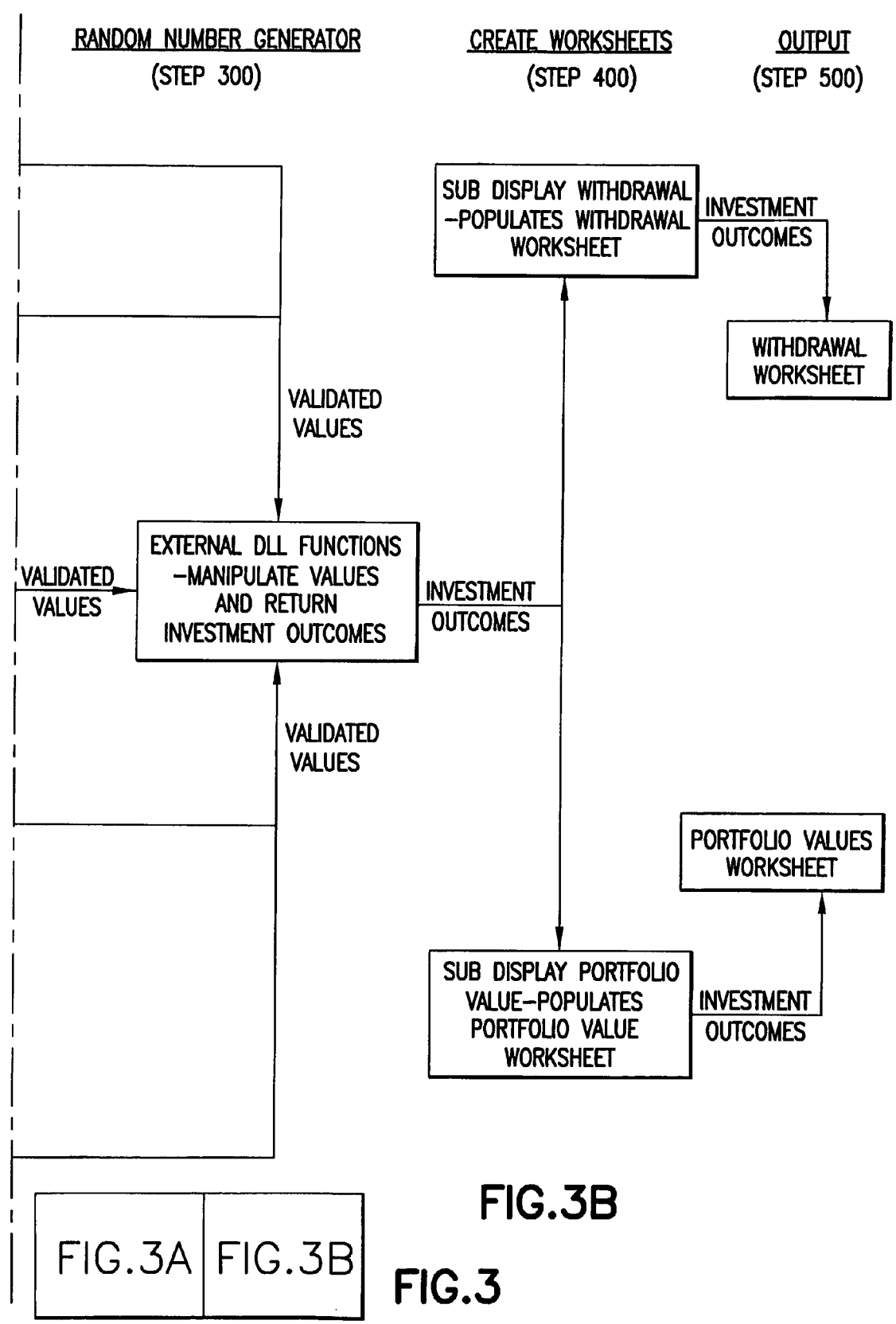

The Hypothetical Illustrator of the invention can store a variety of withdrawal worksheets and/or portfolio values worksheets based on varying withdrawal strategies and/or asset allocations suitable for use by a financial advisor. For example, worksheets can be stored which correspond to various combinations of fixed dollar withdrawal amounts on an integer basis in the range of 0 to 10%, fixed percent withdrawals on an integer basis in the range of 0 to 12% and asset allocations on an integer basis in the ranges shown in Table 3. Of course any integer range for any of the foregoing variables which is suitable for use by a financial advisor can be used in the invention, including storing worksheets where the values for the foregoing variables vary on a fraction or decimal basis. An example of the creation of withdrawal and portfolio values worksheets corresponding to a fixed dollar withdrawal of, e.g., 4%, a fixed percent withdrawal of, e.g., 4%, and an asset allocation of, e.g., H70-20-10, for an initial investment of, e.g., $1,000,000, is shown in FIG. 3.

As shown in step 100, the following information is input into the software program for generating a hypothetical distribution of investment outcomes according to the invention: (1) Deflator (e.g., U.S. Inflation); (2) Number of paths to be taken (e.g., 500); (3) designated time period (e.g., 1996–2027); (4) Asset Allocation (e.g., H70-20-10); (5) Investment Time Period (lump sum); (6) Initial Investment (e.g., $1,000,000); (7) Fixed Dollar Withdrawal Amount (e.g., 4%); and (8) Fixed Percent Withdrawal Amount (e.g., 4%). The number of paths selected relates to the number of times the software will generate a random number of years and link the corresponding actual rate of inflation and actual annual returns. Any number of paths suitable for use in the invention can be selected. The investment time period can be for any period of time, e.g., installments made over a period of five years, ten years, twenty years. In this example, a lump sum of $1,000,000 is invested.

Referring to Step 200, the input data is converted for use in the software which generates the hypothetical distribution of investment outcomes. In Step 300, the random number generator of the software randomly selects the order of years for 500 different paths to generate the hypothetical distribution of investment outcomes according to the invention. The hypothetical distribution of investment outcomes is converted to a withdrawal worksheet and a portfolio values worksheet in Step 400. The withdrawal worksheet and portfolio values worksheet are output in Step 500 for use in the Hypothetical Illustrator of the invention.

Figure 4B:
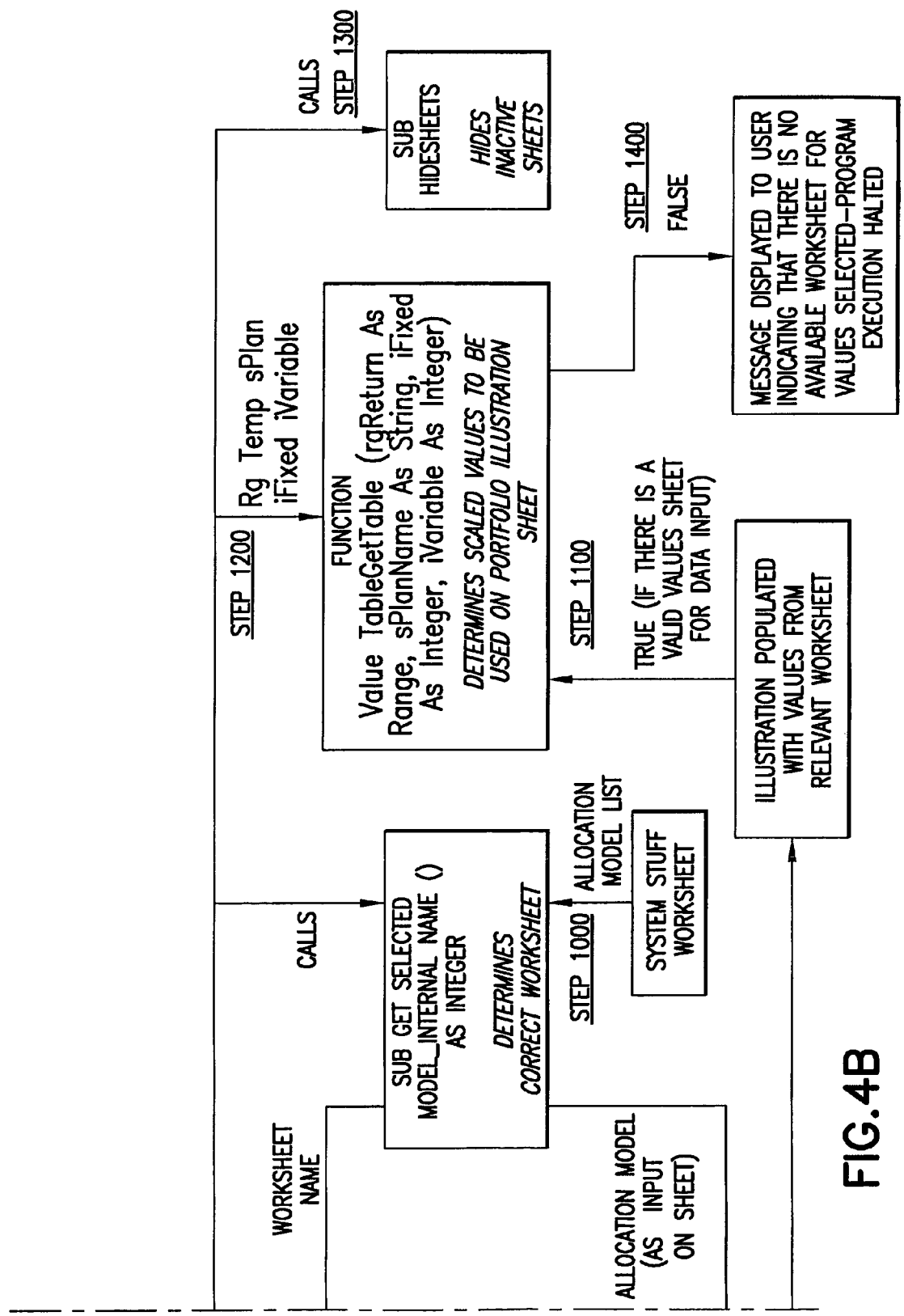
FIG. 4 is an exemplary flow chart illustrating the steps for generating a hypothetical illustration of a distribution of possible portfolio values (based on the interaction of a specified initial investment, fixed dollar withdrawal, fixed percent withdrawal and asset allocation with a corresponding portfolio values worksheet derived from a hypothetical distribution of investment outcomes).
Figure 5A:
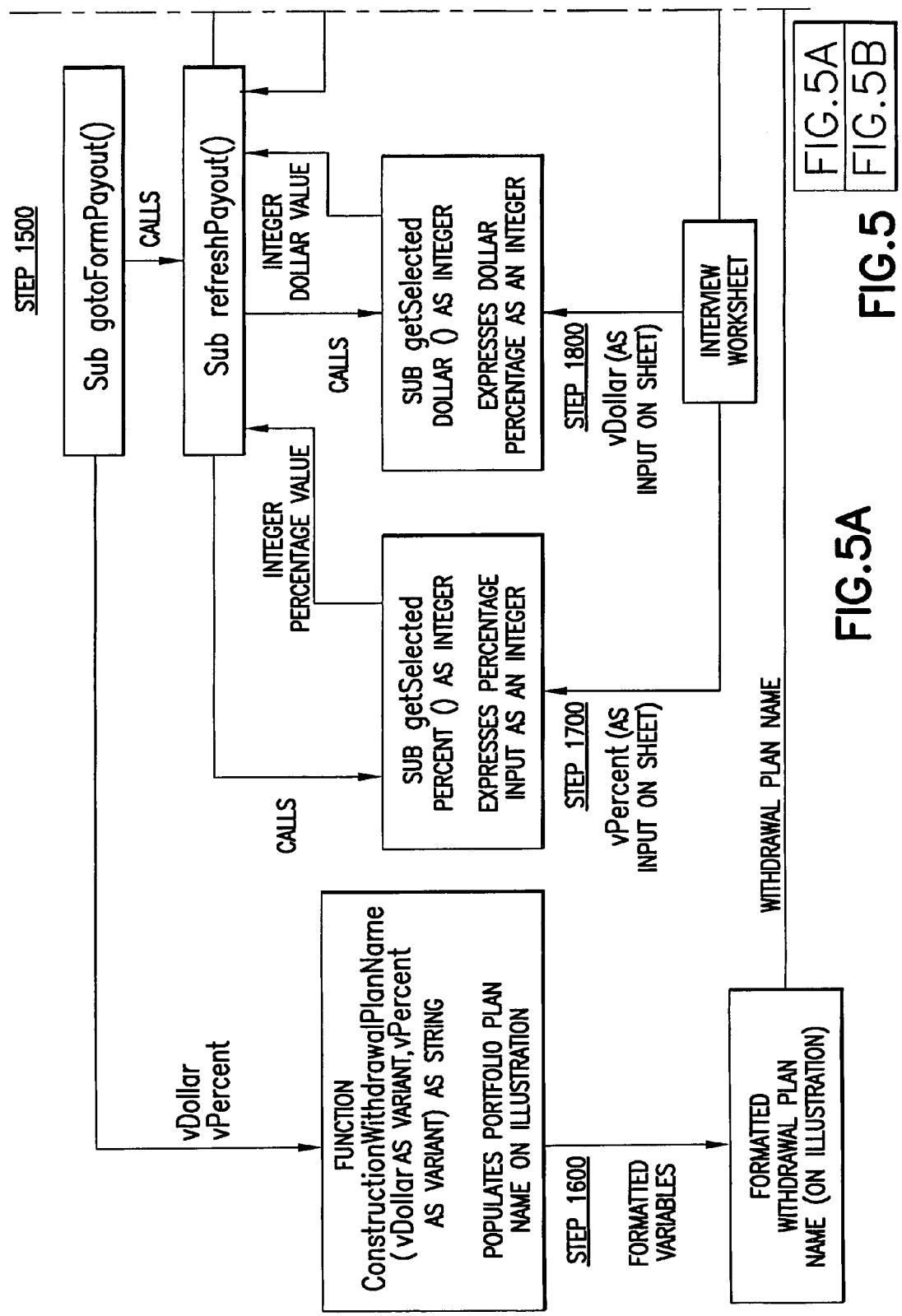
FIG. 5 is an exemplary flow chart illustrating the steps for generating a hypothetical illustration of a distribution of possible withdrawal amounts (based on the interaction of a specified initial investment, fixed dollar withdrawal, fixed percent withdrawal and asset allocation with a corresponding withdrawal worksheet derived from a hypothetical distribution of investment outcomes).
Figure 5B:
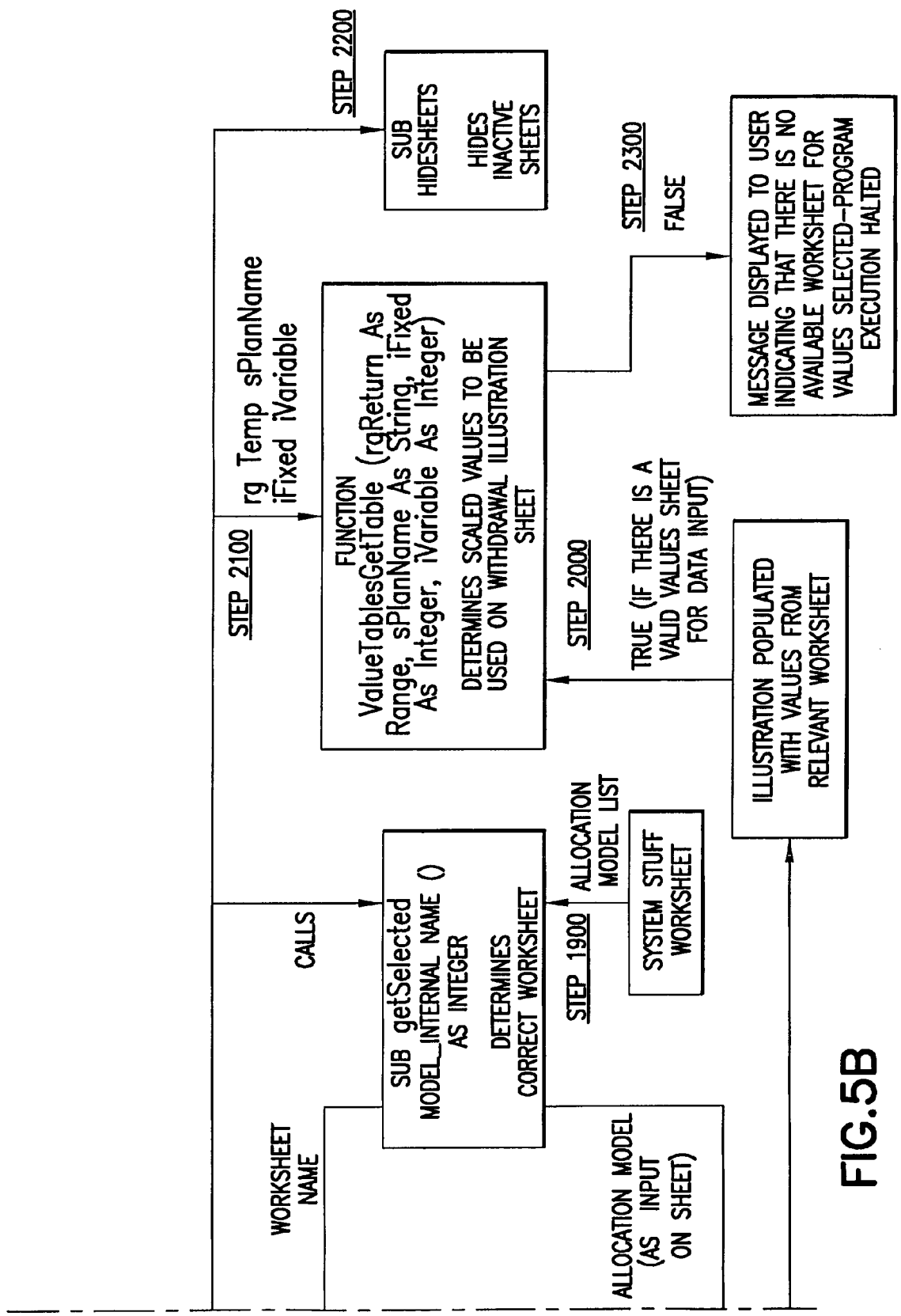

As indicated above, a plurality of such worksheets can be stored for use in the Hypothetical Illustrator of the invention. FIGS. 4 and 5 show how such worksheets are converted by the Hypothetical Illustrator into a hypothetical illustration of a distribution of possible portfolio values and withdrawal amounts.

FIG. 4 is an exemplary flow chart illustrating the steps for generating a hypothetical illustration of a distribution of possible portfolio values (based on the interaction of a specified initial investment, fixed dollar withdrawal, fixed percent withdrawal and asset allocation with a corresponding portfolio values worksheet derived from a hypothetical distribution of investment outcomes). As shown in FIG. 4, the client/advisor inputs the following data into the Hypothetical Illustrator (Step 600): (1) initial investment; (2) fixed dollar withdrawal; (3) fixed percent withdrawal; and (4) asset allocation. If the fixed dollar and fixed percent withdrawal values and asset allocation values are expressed as integers, the Hypothetical Illustrator formats a portfolio plan name based on the input values (Step 700) and interacts the input values with the portfolio values worksheets stored therein by searching for a match of the input values with corresponding values of a portfolio values worksheet. If a match exists, the Hypothetical Illustrator creates an illustration populated with portfolio values generated from the corresponding worksheet (Step 1100). (Noncorresponding worksheets remain inactive (Step 1300)).

In Step 1200, the Hypothetical Illustrator scales the portfolio values to be output in the hypothetical illustration based on the initial investment input by a client/advisor. For example, the portfolio values of the worksheet shown in FIG. 3 which are based on a $1,000,000 initial investment are scaled down to correspond to, e.g., an actual initial investment of $500,000 input by a client/advisor. On the other hand, such portfolio values are scaled up corresponding to an actual initial investment greater than $1,000,000.

Referring to Step 1400, in the event a fixed dollar withdrawal and/or fixed percent withdrawal and/or asset allocation does not interact with a corresponding value of any of the portfolio values worksheets stored for use in the Hypothetical Illustrator, a message is displayed to the user indicating that there is no available worksheet for the values selected—the program execution is halted.

As shown in this embodiment of the invention, the Hypothetical Illustrator only accepts fixed dollar and fixed percent withdrawals and an asset allocation expressed in integer values. Referring to Steps 800 and 900, fixed dollar and fixed percent withdrawal values expressed as a fraction or decimal value are converted to the nearest integer value, respectively. A corresponding worksheet is then selected (Step 1000).

FIG. 5 is an exemplary flow chart illustrating the steps for generating a hypothetical illustration of a distribution of possible withdrawal amounts (based on the interaction of a specified initial investment, fixed dollar withdrawal, fixed percent withdrawal and asset allocation with a corresponding withdrawal worksheet derived from a hypothetical distribution of investment outcomes.) As shown in FIG. 5, the client/advisor inputs the following data into the Hypothetical Illustrator (Step 1500): (1) initial investment; (2) fixed dollar withdrawal; (3) fixed percent withdrawal; (4) asset allocation. If the fixed dollar and fixed percent withdrawal values and asset allocation value are expressed as integers, the Hypothetical Illustrator formats a withdrawal plan name based on the input values (Step 1600) and interacts the input values with the withdrawal worksheets stored therein by searching for a match of the input values with corresponding values of a withdrawal worksheet. If a match exists, the Hypothetical Illustrator creates an illustration populated with withdrawal amounts generated from the corresponding worksheet (Step 2000). (Noncorresponding worksheets remain inactive (Step 2200)).

In Step 2100, the Hypothetical Illustrator scales the withdrawal amounts to be output in the hypothetical illustration based on the initial investment input by a client/advisor. For example, the withdrawal amounts of the worksheet shown in FIG. 3 which are based on a $1,000,000 initial investment are scaled down to correspond to, e.g., an actual initial investment of $500,000 input by a client/advisor. On the other hand, such portfolio values are scaled up corresponding to an actual initial investment greater than $1,000,000.

Referring to Step 2300, in the event a fixed dollar withdrawal and/or fixed percent withdrawal and/or asset allocation does not interact with a corresponding value of any of the withdrawal worksheets stored for use in the Hypothetical Illustrator, a message is displayed to the user indicating that there is no available worksheet for the values selected—the program execution is halted.

As shown in this embodiment of the invention, the Hypothetical Illustrator only accepts fixed dollar and fixed percent withdrawals and an asset allocation expressed in integer values. Referring to Steps 1700 and 1800, fixed dollar and fixed percent withdrawal values expressed as a fraction or decimal value are converted to the nearest integer value, respectively. A corresponding worksheet is then selected (Step 1900).

The following examples further illustrate the Hypothetical Illustrator of the invention.

EXAMPLE 1

By way of example, Mr. & Mrs. M. T. Nester and their advisor submit a SELIGMAN HARVESTER® Proposal Request Form. As shown in FIG. 6A, the proposal sets forth the following information for input into the Hypothetical Illustrator:

Prepared For: Mr. & Mrs. M. T. Nester
Date Prepared: Dec. 18, 1998
Initial Investment: $1,000,000
6% Fixed Dollar Withdrawal ($60,000)
2% Fixed Percent Withdrawal
Asset Allocation: H60-30-10
Prepared By: Trusted Financial Advisor.

As shown in FIGS. 6B and 6C, the Hypothetical Illustrator of the invention interacts the foregoing information with a corresponding withdrawal worksheet and portfolio values worksheet and outputs a hypothetical distribution of possible outcomes on a year-by-year basis for 30 years for portfolio values and withdrawal amounts, respectfully. For example, in FIG. 6B, in the worst case scenario (10% probability), Mr. & Mrs. Nester will run out of money after 16 years under this investment strategy. In the median scenario (50% probability), Mr. & Mrs. Nester will not run out of money until after 28 years and in the best case scenario (10% probability), Mr. & Mrs. Nester will have increased their initial investment of $1,000,000 to $6,820,765 after 30 years.

FIG. 6B shows that in the worst case scenario (10% probability), Mr. & Mrs. Nester will have no money to withdraw after year 17 under this investment strategy. Under the median scenario (50% probability), Mr. & Mrs. Nesters' ability to withdraw money slowly dwindles after year 1 so that by year 29 they can only withdraw up to $40,285, and by year 30 their ability to withdraw money ceases. In the best case scenario (10% probability), Mr. & Mrs. Nesters' ability to withdraw money increases each year so that by year 30 they can withdraw up to $107,760.

Of course, in the case of the worst case scenario, the withdrawal strategy can be adjusted at any time to account for downward fluctuations in the market, i.e., by lowering the more flexible fixed-percent withdrawal. Likewise, in the case of the best case scenario, the withdrawal strategy can be adjusted at any time to increase the amount of money withdrawn if the client so desires. Similarly, the asset allocation can be adjusted at any time to account for changes in the market.

EXAMPLE 2

In a second example, Mr. & Mrs. M. T. Nester and their advisor submitted a SELIGMAN HARVESTER® Proposal Request Form. As shown in FIG. 7A, the proposal sets forth the following information for input into the Hypothetical Illustrator:

Prepared For: Mr. & Mrs. M. T. Nester
Date Prepared: Dec. 18, 1998
Initial Investment: $1,000,000
8% Fixed Dollar Withdrawal ($80,000)
0% Fixed Percent Withdrawal
Asset Allocation: H60-30-10
Prepared By: Trusted Financial Advisor.

As shown in FIGS. 7B and 7C, the Hypothetical Illustrator of the invention interacts the foregoing information with a corresponding withdrawal worksheet and portfolio values worksheet and outputs a hypothetical distribution of possible outcomes on a year-by-year basis for 30 years for portfolio values and withdrawal amounts, respectfully. For example, in FIG. 7B, in the worst case scenario (10% probability), Mr. & Mrs. Nester will run out of money after 13 years under this investment strategy. In the median scenario (50% probability), Mr. & Mrs. Nester will not run out of money until after 24 years and in the best case scenario (10% probability), Mr. & Mrs. Nester will have increased their initial investment of $1,000,000 to $9,305,635 after 30 years.

FIG. 7B shows that in the worst case scenario (10% probability), Mr. & Mrs. Nester will have no money to withdraw after year 14 under this investment strategy. Under the median scenario (50% probability), Mr. & Mrs. Nester will still be able to withdraw up to $80,000 in year 25 before their ability to withdraw money ceases the following year, and in the best case scenario (10% probability), Mr. & Mrs. Nester will be withdrawing up to $80,000 for each year of the 30 year designated period.

The $80,000 amount is in constant dollars. As shown in FIG. 7C, the $80,000 figure remains constant in the withdrawal table, because the fixed dollar withdrawal is increased for the change in the CPI to account for inflation, and then decreased by the change in the CPI to express the withdrawal amount in constant dollars.

Of course, in the case of the worst case scenario, the withdrawal strategy can be adjusted at any time to account for downward fluctuations in the market, i.e., by lowering the fixed dollar withdrawal and/or perhaps increasing the fixed percent withdrawal. Likewise, in the case of the best case scenario, the withdrawal strategy can be adjusted at any time to increase the amount of money withdrawn if the client so desires. Similarly, the asset allocation can be adjusted at any time to account for changes in the market.

EXAMPLE 3

In a third example as shown in FIG. 8A, Mr. & Mrs. Nester's financial advisor recommended a different withdrawal strategy of 4% fixed dollar withdrawal ($40,000) and 4% fixed percent withdrawal for the same initial investment and the same asset allocation. FIGS. 8B and 8C show the changes in the hypothetical distribution of the possible outcomes for portfolio values and withdrawal amounts for this withdrawal strategy relative to the withdrawal strategies of Examples 1 and 2.

As shown in the examples above, the Hypothetical Illustrator of the invention generates hypothetical illustrations for both portfolio values and withdrawal amounts. In the foregoing examples, portfolio values are generated in nominal dollars, and withdrawal amounts are generated in constant dollars (i.e., they are deflated (or inflated) for the hypothetical increases (or decreases) in the CPI). The invention is also capable of generating output in any combination of nominal and fixed dollars. The output combinations are listed below:

| Portfolio Value | Withdrawal Amount |
| --- | --- |
| Nominal | Nominal |
| Nominal | Constant |
| Constant | Nominal |
| Constant | Constant |

The present invention can be practiced on a personal computer. The software or data and information which facilitates use of the invention can be installed directly on a personal computer or it can be down-loaded or up-loaded from a local-area network (LAN) or a wide-area network (WAN) such as the Internet. The invention can also be accessed and utilized on an LAN or WAN. Information for use by the invention or generated by the invention can be communicated directly between a financial advisor and an individual via numerous means of communication, including but not limited to, by LAN or WAN, electronic mail, voice mail, facsimile, postal mail, telephone, wireless communications, or any other off-line or on-line means of communication.

By way of example of an on-line communication, an individual (or their advisor) can log onto a particular Internet web site, wherein a directory guides the individual to a SELIGMAN HARVESTER® risk management system web page. The web page allows the individual to input and submit, e.g.: (1) an initial investment, (2) a fixed dollar and a fixed percent withdrawal and (3) an asset allocation. The invention receives the foregoing information, generates a hypothetical distribution of investment outcomes for the specific asset allocation, and interacts the hypothetical distribution of investment outcomes with the fixed dollar and fixed percent withdrawal to a hypothetical illustration of a distribution of possible portfolio values or withdrawal amounts, whose results are scaled based on the amount of the initial investment. By varying the specified fixed dollar withdrawal, and/or the specified fixed percent withdrawal and/or the specified asset allocation, an individual can determine a hypothetical illustration of possible portfolio values or withdrawal amounts for each combination, and thereby make an informed selection of the strategy most appropriate for themselves.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used as terms of description and not terms of limitation. There is no intention to use the terms or expressions to exclude any equivalents of features shown and described or portions thereof and this invention should be defined in accordance with the claims which follow.

What is claimed is:

1. A method comprising:
   obtaining data comprising rates of return for a plurality of asset classes and at least one rate of inflation;
   obtaining for a particular individual a financial portfolio to be evaluated based on an initial investment allocated to at least one of the asset classes, and a desired withdrawal amount having a fixed dollar amount and a fixed percentage amount;
   generating in a computer a prohabilistic distribution of investment outcomes for the financial portfolio on an incremental basis within a designated time period by determining a plurality of projected portfolio values using the rates of return for the asset classes and the rate of inflation; and
   determining, for each of the projected portfolio values, a projected withdrawal amount that corresponds to the desired withdrawal amount by adding together the fixed percentage amount of the projected portfolio value and the fixed dollar amount.

2. The method of claim 1, wherein the distribution of investment outcomes is generated on an annual basis within a 30 year period.

3. The method of claim 1, further comprising the step of displaying to the individual an illustration of the distribution of investment outcomes for the financial portfolio.

4. The method of claim 3, further comprising the step of selecting an appropriate investment strategy by iteratively varying a variable selected from the group consisting of: the fixed dollar withdrawal amount, the fixed percentage withdrawal amount, a composition of the financial portfolio, and combinations thereof, and reviewing the illustration of the distribution of investment outcomes.

5. The method of claim 3, wherein the illustration is a portfolio chart having an x-axis that ranges from a worst case scenario to a best case scenario, and y-axis that ranges, on the incremental basis, from the beginning to the end of the designated time period and the portfolio chart containing the projected portfolio values.

6. The method of claim 5, wherein the illustration further comprises a withdrawal chart having an x-axis that ranges from a worst case scenario to a best case scenario, and y-axis that ranges, on the incremental basis, from the beginning to the end of the designated time period and the withdrawal chart containing the total amount of the fixed dollar withdrawal amount and the fixed percentage withdrawal amount.

7. The method of claim 1, wherein the asset classes are selected from the group consisting of: U.S. Large Cap stocks, U.S. Mid Cap stocks, U.S. Small Cap stocks, International Large Cap stocks, International Mid Cap stocks, International Small Cap stocks, Emerging Markets stocks, Corporate Bonds, Government Bonds, 30-Day U.S. Treasury Bills, and combinations thereof.

8. A computer-readable medium having computer-executable instructions, comprising instructions for:
obtaining data comprising rates of return for a plurality of asset classes and at least one rate of inflation;
obtaining for a particular individual a financial portfolio to be evaluated based on an initial investment allocated to at least one of the asset classes, and a desired withdrawal amount having a fixed dollar amount and a fixed percentage amount;
generating a probabilistic distribution of investment outcomes for the financial portfolio on an incremental basis within a designated time period by determining a plurality of projected portfolio values using the rates of return of the asset classes and the rate of inflation; and
determining, for each of the projected portfolio values, a projected withdrawal amount that corresponds to the desired withdrawal amount by adding together the fixed percentage amount of the projected portfolio value and the fixed dollar amount.

9. The computer-readable medium of claim 8, wherein the distribution of investment outcomes is generated on an annual basis within a 30 year period.

10. The computer-readable medium of claim 8, further comprising instructions for displaying to the individual an illustration of the distribution of investment outcomes for the financial portfolio.

11. The computer-readable medium of claim 10, further comprising instructions for selecting an appropriate investment strategy by iteratively varying a variable selected from the group consisting of: the fixed dollar withdrawal amount, the fixed percentage withdrawal amount, a composition of the financial portfolio, and combinations thereof, and reviewing the illustration of the distribution of investment outcomes.

12. The computer-readable medium of claim 10, wherein the illustration is a portfolio chart having an x-axis that ranges from a worst case scenario to a best case scenario, and y-axis that ranges, on the incremental basis, from the beginning to the end of the designated time period and the portfolio chart containing the projected portfolio values.

13. The computer-readable medium of claim 12, wherein the illustration further comprises a withdrawal chart having an x-axis that ranges from a worst case scenario to a best case scenario, and y-axis that ranges, on the incremental basis, from the beginning to the end of the designated time period and the withdrawal chart containing the total amount of the fixed dollar withdrawal amount and the fixed percentage withdrawal amount.

14. The computer-readable medium of claim 8, wherein the asset classes are selected from the group consisting of U.S. Large Cap stocks, U.S. Mid Cap stocks, U.S. Small Cap stocks, International Large Cap stocks, International Mid Cap stocks, International Small Cap stocks, Emerging Markets stocks, Corporate Bonds, Government Bonds, 30-Day U.S. Treasury Bills, and combinations thereof.

15. An apparatus for facilitating asset allocation and withdrawal strategy, the apparatus comprising:
a storage device;
a processor connected to the storage device;
a program stored in the storage device and configured to control the processor; and
the processor operative with the program to:
obtain data comprising rates of return for a plurality of asset classes and at least one rate of inflation;
select for a particular individual a financial portfolio to be evaluated having an initial investment allocated to at least one of the asset classes, and a desired withdrawal amount having a fixed dollar amount and a fixed percentage amount;
generate a probabilistic distribution of investment outcomes for the financial portfolio on an incremental basis within a designated time period by determining a plurality of projected portfolio values using the rates of return of the asset classes and the rate of inflation; and
determining, for each of the projected portfolio values, a projected withdrawal amount that corresponds to the desired withdrawal amount by adding together the fixed percentage amount of the projected portfolio value and the fixed dollar amount.

16. The apparatus of claim 15, wherein the distribution of investment outcomes is generated on an annual basis within a 30 year period.

17. The apparatus of claim 15, wherein the processor is further operative with the program to display to the individual an illustration of the distribution of investment outcomes for the financial portfolio.

18. The apparatus of claim 17, wherein the processor is further operative with the program to select an appropriate investment strategy by iteratively varying a variable selected from the group consisting of the fixed dollar withdrawal amount, the fixed percentage withdrawal amount, a composition of the financial portfolio, and combinations thereof, and to review the illustration of the distribution of investment outcomes.

19. The apparatus of claim 17, wherein the illustration is a portfolio chart having an x-axis that ranges from a worst case scenario to a best case scenario, and y-axis that ranges, on the incremental basis, from the beginning to the end of the designated time period and the portfolio chart containing the projected portfolio values.

20. The apparatus of claim 19, wherein the illustration further comprises a withdrawal chart having an x-axis that ranges from a worst case scenario to a best case scenario, and y-axis that ranges, on the incremental basis, from the beginning to the end of the designated time period and the withdrawal chart containing the total amount of the fixed dollar withdrawal amount and the fixed percentage withdrawal amount.

21. The apparatus of claim 15, wherein the asset classes are selected from the group consisting of U.S. Large Cap stocks, U.S. Mid Cap stocks, U.S. Small Cap stocks, International Large Cap stocks, International Mid Cap stocks, International Small Cap stocks, Emerging Markets stocks, Corporate Bonds, Government Bonds, 30-Day U.S. Treasury Bills, and combinations thereof.

22. A computer program in a computer-readable memory device, the computer program comprising:
first program means for obtaining data comprising rates of return for a plurality of asset classes and at least one rate of inflation;
second program means for obtaining for a particular individual a financial portfolio to be evaluated based on an initial investment allocated to at least one of the asset classes, and a desired withdrawal amount having a fixed dollar amount and a fixed percentage amount; and
third program means for generating a probabilistic distribution of investment outcomes for the financial portfolio on an incremental basis within a designated time period by determining a plurality of projected portfolio values using the rates of return of the asset classes and the rate of inflation, and determining, for each of the projected portfolio values, a projected withdrawal amount that corresponds to the desired withdrawal amount by adding together the fixed percentage amount of the projected portfolio value and the fixed dollar amount.

23. A method comprising:
obtaining data comprising historical rates of return for a plurality of asset classes for a plurality of historical periods and data comprising at least one rate of inflation;
obtaining for a particular individual a financial portfolio to be evaluated based on an initial investment allocated to at least one of the asset classes, and a desired withdrawal amount comprising a fixed dollar amount and a fixed percentage of the projected portfolio value;
generating in a computer a probabilistic distribution of investment outcomes for the financial portfolio on an incremental basis within a designated time period by determining a plurality of projected portfolio values using the historical rates of return of the asset classes and the rate of inflation; and
determining, for each of the projected portfolio values, a projected withdrawal amount that corresponds to the desired withdrawal amount by adding together the fixed percentage amount of the projected portfolio value and the fixed dollar amount and adjusting for the rate of inflation.

24. The method of claim 1, wherein the step of obtaining data comprising at least one rate of inflation comprises obtaining data comprising historical rates of inflation for a plurality of historical periods.

25. The method of claim 1, wherein the step of obtaining data comprising rates of return and at least one rate of inflation comprises obtaining historical data for a plurality of historical periods, the data comprising historical rates of return for a plurality of asset classes and historical rates of inflation.

26. The method of claim 7, wherein the initial investment is allocated among (1) 0%–100% U.S. large-cap stocks; (2) 0%–15% U.S. mid-cap stocks, (3) 0%–100% U.S. small-cap stocks, (4) 0%–100% international large-cap stocks, (5) 0%–20% international mid-cap stocks, (6) 0%–10% international small-cap stocks, (7) 0%–10% emerging markets stocks, (8) 0%–100% U.S. long-term corporate bonds, (9) 0%–100% U.S. government bonds, (10) 0%–10% inflation index bonds and (11) 0%–100% U.S. 30-day treasury bills.

27. The method of claim 26, wherein the initial investment is allocated among (1) 20%–100% U.S. large-cap stocks; (2) 0%–15% U.S. mid-cap stocks, (3) 0%–40% U.S. small-cap stocks, (4) 0%–35% international large-cap stocks, (5) 0%-20% international mid-cap stocks, (6) 0%-10% international small-cap stocks, (7) 0%–15% emerging markets stocks, (8) 0%–60% U.S. long-term corporate bonds, and (9) 0%–10% U.S. 30-day treasury bills.

28. The method of claim 27, wherein 10% or less of the initial investment is allocated among (1) U.S. mid-cap stocks, (2) U.S. small-cap stocks, (3) international mid-cap stocks, (4) international small-cap stocks, and (5) emerging markets stocks.

29. The method of claim 27, wherein between 15% and 25% of the initial investment is allocated among (1) international large-cap stocks, (2) international mid-cap stocks, (3) international small-cap stocks and (4) emerging markets stocks.

30. The method of claim 26, wherein, if the particular individual is a retiree, at least 60°% of the initial investment is allocated among U.S. large-cap stocks, U.S. mid-cap stocks, U.S. small-cap stocks, international large-cap stocks, international mid-cap stocks, international small-cap stocks, and emerging markets stocks.

31. The method of claim 26, wherein about 10% of the initial investment is allocated among cash, cash equivalents or U.S. 30-day treasury bills.

32. The method of claim 1, wherein obtaining the desired withdrawal amount comprises:
identifying total income from social security, pensions and other fixed income sources;
determining the individual's "needs" by identifying expenses that must be met and other fixed obligations;
determining the individual's "wants" by identifying expenses that are discretionary;
calculating the fixed dollar amount by expressing the "needs" as a percent of the initial investment; and
calculating the fixed percentage amount by expressing the "wants" as a percent of the initial investment or the projected portfolio value.

33. The method of claim 32, wherein the desired withdrawal amount is selected from the group consisting of: (1) 6% fixed dollar amount and 0% fixed percentage amount, (2) 5% fixed dollar amount and 2% fixed percentage amount, (3) 4% fixed dollar amount and 4% fixed percentage amount, (4) 3% fixed dollar amount and 6% fixed percentage amount, and (5) 2% fixed dollar amount and 8% fixed percentage amount.

34. The method of claim 32, wherein obtaining the financial portfolio to be evaluated comprises:
defining an income target equal to at least half of the needs; and
allocating the initial investment among the asset classes so that dividend and interest provide the income target.

35. The method of claim 34, wherein, based on the fixed dollar amount and the income target, the initial investment is allocated among equity assets, fixed income assets and cash as shown in the table below:

| Fixed Dollar Amount | Income Target | PORTFOLIO ALLOCATION | | |
|---|---|---|---|---|
| | | Equity | Fixed Income | Cash |
| 6% | 3.0% | 60% | 30% | 10% |
| 5% | 2.5% | 65% | 25% | 10% |
| 4% | 2.0% | 70% | 20% | 10% |
| 3% | 1.5% | 75% | 15% | 10% |
| 2% | 1.0% | 80% | 10% | 10% |

36. The method of claim 1, wherein the fixed dollar amount ranges from 0 to 10% and the fixed percentage amount ranges from 0 to 12%.

37. A method of selecting a withdrawal strategy and asset allocation that best balances a desire for income with a risk of running out of money for a specific client given their individual financial situation and financial obligations, the method comprising:

receiving (1) a client's name, (2) a client's total initial investable assets, and (3) a withdrawal amount having a fixed dollar withdrawal amount and a fixed percentage withdrawal amount;

determining a recommended asset allocation of the initial investable assets; and generating in a computer a probabilistic distribution of investment outcomes for the recommended asset allocation and the withdrawal amount on an annual basis for 30 years, from the worst 10% of the time, to the best 10% of the time.

38. The method of claim 37, further comprising allowing the client to make an informed selection of the asset allocation most suitable for themselves by iteratively (1) varying a variable selected from the group consisting of the fixed dollar withdrawal amount, the fixed percentage withdrawal amount and the asset allocation, (2) generating in the computer the probabilistic distribution of investment outcomes and (3) displaying to the client the probabilistic distribution of investment outcomes.

* * * * *

UNITED STATES PATENT AND TRADEMARK OFFICE
CERTIFICATE OF CORRECTION

PATENT NO. : 6,985,880 B1
DATED : January 10, 2006
INVENTOR(S) : Stephen J. Hodgdon et al.

It is certified that error appears in the above-identified patent and that said Letters Patent is hereby corrected as shown below:

<u>Column 18,</u>
Line 42, delete "prohabilistic" and insert -- probabilistic --.

Signed and Sealed this

Twenty-eighth Day of March, 2006

JON W. DUDAS
*Director of the United States Patent and Trademark Office*